US010795012B2

(12) United States Patent
Santra et al.

(10) Patent No.: US 10,795,012 B2
(45) Date of Patent: Oct. 6, 2020

(54) SYSTEM AND METHOD FOR HUMAN BEHAVIOR MODELLING AND POWER CONTROL USING A MILLIMETER-WAVE RADAR SENSOR

(71) Applicant: Infineon Technologies AG, Neubiberg (DE)

(72) Inventors: Avik Santra, Munich (DE); Ashutosh Baheti, Munich (DE); Thomas Finke, Gilching (DE); Reinhard-Wolfgang Jungmaier, Aying (DE); Saverio Trotta, Munich (DE); Raghavendran Vagarappan Ulaganathan, Munich (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 320 days.

(21) Appl. No.: 15/876,769

(22) Filed: Jan. 22, 2018

(65) Prior Publication Data

US 2019/0227156 A1   Jul. 25, 2019

(51) Int. Cl.
*G01S 13/50* (2006.01)
*G01S 7/41* (2006.01)
(Continued)

(52) U.S. Cl.
CPC ............. *G01S 13/505* (2013.01); *G01S 7/10* (2013.01); *G01S 7/415* (2013.01); *G01S 13/42* (2013.01);
(Continued)

(58) Field of Classification Search
CPC ......... G01S 13/505; G01S 13/42; G01S 13/56
See application file for complete search history.

(56) References Cited

U.S. PATENT DOCUMENTS 4,241,347 A    12/1980 Albanese et al.
5,144,954 A *   9/1992 Satake ............... G01N 29/0609
                                                 600/447
(Continued)

FOREIGN PATENT DOCUMENTS

CN    1463161 A    12/2003
CN    1716695 A     1/2006
(Continued)

OTHER PUBLICATIONS

"BT24MTR11 Using BGT24MTR11 in Low Power Applications 24 GHz Rader," Application Note AN341, Revision: Rev 1.0, Infineon Technologies AG, Munich, Germany, Dec. 2, 2013, 25 pages.
(Continued)

*Primary Examiner* — Marc Anthony Armand
(74) *Attorney, Agent, or Firm* — Slater Matsil, LLP

(57) ABSTRACT

An embodiment method includes identifying a set of targets within a field of view of a millimeter-wave radar sensor based on radar data received by the millimeter-wave radar sensor; capturing radar data corresponding to the set of targets across a macro-Doppler frame; performing macro-Doppler processing on the macro-Doppler frame and determining whether a macro-Doppler signal is present in the macro-Doppler frame based on the macro-Doppler processing; capturing radar data corresponding to the set of targets across a micro-Doppler frame, wherein the micro-Doppler frame has a duration equal to a first plurality of macro-Doppler frames; performing micro-Doppler processing on the micro-Doppler frame and determining whether a micro-Doppler signal is present in the micro-Doppler frame based on the micro-Doppler processing; and activating at least one range bin of a plurality of range bins in response to a determination that at least one of the macro-Doppler signal or the micro-Doppler signal is present.

26 Claims, 19 Drawing Sheets

(51) Int. Cl.

| | | |
|---|---|---|
| *G01S 13/56* | (2006.01) | |
| *G01S 13/42* | (2006.01) | |
| *G01S 7/10* | (2006.01) | |
| *G06K 9/00* | (2006.01) | |
| *G01S 7/288* | (2006.01) | |
| *G01S 13/536* | (2006.01) | |
| *G01S 13/522* | (2006.01) | |
| *G01S 7/292* | (2006.01) | |

(52) U.S. Cl.
CPC .......... *G01S 13/56* (2013.01); *G06K 9/00342* (2013.01); *G06K 9/00369* (2013.01); *G01S 7/2927* (2013.01); *G01S 13/522* (2013.01); *G01S 13/536* (2013.01); *G01S 2007/2883* (2013.01)

(56) References Cited

U.S. PATENT DOCUMENTS

| | | | |
|---|---|---|---|
| 6,147,572 | A | 11/2000 | Kaminski et al. |
| 6,414,631 | B1 | 7/2002 | Fujimoto |
| 6,636,174 | B2 | 10/2003 | Arikan et al. |
| 7,048,973 | B2 | 5/2006 | Sakamoto et al. |
| 7,057,564 | B2 | 6/2006 | Tsai et al. |
| 7,171,052 | B2 | 1/2007 | Park |
| 7,317,417 | B2 | 1/2008 | Arikan et al. |
| 7,596,241 | B2 | 9/2009 | Rittscher et al. |
| 7,692,574 | B2 | 4/2010 | Nakagawa |
| 7,873,326 | B2 | 1/2011 | Sadr |
| 7,889,147 | B2 | 2/2011 | Tam et al. |
| 8,228,382 | B2 | 7/2012 | Pattikonda |
| 8,497,805 | B2 | 7/2013 | Rofougaran et al. |
| 8,659,369 | B2 | 2/2014 | Rofougaran et al. |
| 8,731,502 | B2 | 5/2014 | Salle et al. |
| 8,836,596 | B2 | 9/2014 | Richards et al. |
| 8,847,814 | B2 | 9/2014 | Himmelstoss et al. |
| 8,860,532 | B2 | 10/2014 | Gong et al. |
| 8,976,061 | B2 | 3/2015 | Chowdhury |
| 9,172,132 | B2 | 10/2015 | Kam et al. |
| 9,182,476 | B2 | 11/2015 | Wintermantel |
| 9,202,105 | B1 | 12/2015 | Wang et al. |
| 9,413,079 | B2 | 8/2016 | Kamgaing et al. |
| 9,495,600 | B2 | 11/2016 | Heu et al. |
| 9,599,702 | B1* | 3/2017 | Bordes .................. G01S 13/18 |
| 9,886,095 | B2 | 2/2018 | Pothier |
| 9,935,065 | B1 | 4/2018 | Baheti et al. |
| 2003/0179127 | A1 | 9/2003 | Wienand |
| 2004/0238857 | A1 | 12/2004 | Beroz et al. |
| 2006/0001572 | A1 | 1/2006 | Gaucher et al. |
| 2006/0049995 | A1 | 3/2006 | Imaoka et al. |
| 2006/0067456 | A1 | 3/2006 | Ku et al. |
| 2007/0210959 | A1 | 9/2007 | Herd et al. |
| 2008/0106460 | A1 | 5/2008 | Kurtz et al. |
| 2008/0238759 | A1 | 10/2008 | Carocari et al. |
| 2008/0291115 | A1 | 11/2008 | Doan et al. |
| 2008/0308917 | A1 | 12/2008 | Pressel et al. |
| 2009/0073026 | A1 | 3/2009 | Nakagawa |
| 2009/0085815 | A1 | 4/2009 | Jakab et al. |
| 2009/0153428 | A1 | 6/2009 | Rofougaran et al. |
| 2009/0315761 | A1 | 12/2009 | Walter et al. |
| 2010/0207805 | A1 | 8/2010 | Haworth |
| 2011/0299433 | A1 | 12/2011 | Darabi et al. |
| 2012/0087230 | A1 | 4/2012 | Guo et al. |
| 2012/0092284 | A1 | 4/2012 | Rofougaran et al. |
| 2012/0116231 | A1 | 5/2012 | Liao et al. |
| 2012/0195161 | A1 | 8/2012 | Little et al. |
| 2012/0206339 | A1 | 8/2012 | Dahl |
| 2012/0280900 | A1 | 11/2012 | Wang et al. |
| 2013/0027240 | A1 | 1/2013 | Chowdhury |
| 2013/0106673 | A1 | 5/2013 | McCormack et al. |
| 2013/0300573 | A1* | 11/2013 | Brown .................. A61B 5/0002 340/870.01 |
| 2014/0028542 | A1 | 1/2014 | Lovitt et al. |
| 2014/0070994 | A1 | 3/2014 | Schmalenberg et al. |
| 2014/0145883 | A1 | 5/2014 | Baks et al. |
| 2014/0313071 | A1* | 10/2014 | McCorkle .................. G01S 7/28 342/202 |
| 2014/0324888 | A1 | 10/2014 | Xie et al. |
| 2015/0181840 | A1 | 7/2015 | Tupin, Jr. et al. |
| 2015/0185316 | A1 | 7/2015 | Rao et al. |
| 2015/0212198 | A1 | 7/2015 | Nishio et al. |
| 2015/0243575 | A1 | 8/2015 | Strothmann et al. |
| 2015/0277569 | A1 | 10/2015 | Sprenger et al. |
| 2015/0325925 | A1 | 11/2015 | Kamgaing et al. |
| 2015/0346820 | A1 | 12/2015 | Poupyrev et al. |
| 2015/0348821 | A1 | 12/2015 | Iwanaga et al. |
| 2015/0364816 | A1 | 12/2015 | Murugan et al. |
| 2016/0018511 | A1 | 1/2016 | Nayyar et al. |
| 2016/0041617 | A1 | 2/2016 | Poupyrev |
| 2016/0041618 | A1 | 2/2016 | Poupyrev |
| 2016/0061942 | A1 | 3/2016 | Rao et al. |
| 2016/0061947 | A1 | 3/2016 | Patole et al. |
| 2016/0098089 | A1 | 4/2016 | Poupyrev |
| 2016/0103213 | A1 | 4/2016 | Ikram et al. |
| 2016/0109566 | A1 | 4/2016 | Liu et al. |
| 2016/0118353 | A1 | 4/2016 | Ahrens et al. |
| 2016/0146931 | A1 | 5/2016 | Rao et al. |
| 2016/0146933 | A1 | 5/2016 | Rao et al. |
| 2016/0178730 | A1 | 6/2016 | Trotta et al. |
| 2016/0187462 | A1 | 6/2016 | Altus et al. |
| 2016/0191232 | A1 | 6/2016 | Subburaj et al. |
| 2016/0240907 | A1 | 8/2016 | Haroun |
| 2016/0249133 | A1 | 8/2016 | Sorensen |
| 2016/0252607 | A1 | 9/2016 | Saboo et al. |
| 2016/0259037 | A1 | 9/2016 | Molchanov et al. |
| 2016/0266233 | A1 | 9/2016 | Mansour |
| 2016/0269815 | A1 | 9/2016 | Liao et al. |
| 2016/0291130 | A1 | 10/2016 | Ginsburg et al. |
| 2016/0299215 | A1 | 10/2016 | Dandu et al. |
| 2016/0306034 | A1 | 10/2016 | Trotta et al. |
| 2016/0320852 | A1 | 11/2016 | Poupyrev |
| 2016/0320853 | A1 | 11/2016 | Lien et al. |
| 2016/0327633 | A1 | 11/2016 | Kumar et al. |
| 2016/0334502 | A1 | 11/2016 | Ali et al. |
| 2016/0349845 | A1 | 12/2016 | Poupyrev et al. |
| 2017/0033062 | A1 | 2/2017 | Liu et al. |
| 2017/0045607 | A1 | 2/2017 | Bharadwaj et al. |
| 2017/0052618 | A1 | 2/2017 | Lee et al. |
| 2017/0054449 | A1 | 2/2017 | Mani et al. |
| 2017/0060254 | A1 | 3/2017 | Molchanov et al. |
| 2017/0070952 | A1 | 3/2017 | Balakrishnan et al. |
| 2017/0074974 | A1 | 3/2017 | Rao et al. |
| 2017/0074980 | A1 | 3/2017 | Adib et al. |
| 2017/0090014 | A1 | 3/2017 | Subburaj et al. |
| 2017/0090015 | A1 | 3/2017 | Breen et al. |
| 2017/0115377 | A1 | 4/2017 | Giannini et al. |
| 2017/0131395 | A1 | 5/2017 | Reynolds et al. |
| 2017/0139036 | A1 | 5/2017 | Nayyar et al. |
| 2017/0170947 | A1 | 6/2017 | Yang |
| 2017/0176574 | A1 | 6/2017 | Eswaran et al. |
| 2017/0192847 | A1 | 7/2017 | Rao et al. |
| 2017/0201019 | A1 | 7/2017 | Trotta |
| 2017/0212597 | A1 | 7/2017 | Mishra |
| 2017/0364160 | A1 | 12/2017 | Malysa et al. |
| 2018/0046255 | A1 | 2/2018 | Rothera et al. |
| 2018/0071473 | A1 | 3/2018 | Trotta et al. |
| 2018/0101239 | A1 | 4/2018 | Yin et al. |

FOREIGN PATENT DOCUMENTS

| | | |
|---|---|---|
| CN | 101490578 A | 7/2009 |
| CN | 101585361 A | 11/2009 |
| CN | 102788969 A | 11/2012 |
| CN | 102967854 A | 3/2013 |
| CN | 103529444 A | 1/2014 |
| CN | 203950036 U | 11/2014 |
| DE | 102008054570 A1 | 6/2010 |
| DE | 102011075725 A1 | 11/2012 |
| DE | 102014118063 A1 | 7/2015 |
| GB | 2247799 A | 3/1992 |
| JP | 2001174539 A | 6/2001 |
| JP | 2004198312 A | 7/2004 |
| JP | 2006234513 A | 9/2006 |

(56) References Cited

FOREIGN PATENT DOCUMENTS

| | | |
|---|---|---|
| JP | 2008029025 A | 2/2008 |
| JP | 2008089614 A | 4/2008 |
| JP | 2009069124 A | 4/2009 |
| JP | 2011529181 A | 12/2011 |
| JP | 2012112861 A | 6/2012 |
| JP | 2013521508 A | 6/2013 |
| JP | 2014055957 A | 3/2014 |
| KR | 20090063166 A | 6/2009 |
| KR | 20140082815 A | 7/2014 |
| WO | 2007060069 A1 | 5/2007 |
| WO | 2008001092 A2 | 1/2008 |
| WO | 2013009473 A2 | 1/2013 |
| WO | 2016033361 A1 | 3/2016 |
| WO | 2016170005 A1 | 10/2016 |

OTHER PUBLICATIONS

Chen, Xiaolong et al., "Detection and Extraction of Marine Target with Micromotion via Short-Time Fractional Fourier Transform in Sparse Domain," IEEE International Conference on Signal Processing, Communications and Computing, ICSPCC, Aug. 5-8, 2016, 5 pages.

Chuanhua, Du, "FMCW Radar Range-Doppler Processing and Beam Formation Technology," Chinese Doctoral Dissertations & Master's Theses Full Text Database (Masters)—Information Science and Technology Series, China National Knowledge Infrastructure, ISSN 1674-0246, CN 11-9144/G, Dec. 16, 2004-Mar. 2015, 14 pages.

Deacon, Peter et al., "Frequency Modulated Continuous Wave (FMCW) Radar," Design Team 6 Technical Lecture, Nov. 9, 2011, 27 pages.

Dham, Vivek "Programming Chirp Parameters in TI Radar Devices," Application Report SWRA553, Texas Instruments, May 2017, 15 pages.

Diederichs, Kailtyn et al., "Wireless Biometric Individual Identification Utilizing Millimeter Waves", IEEE Sensors Letters, vol. 1, No. 1, IEEE Sensors Council 3500104, Feb. 2017, 4 pages.

Dooring Alert Systems, "Riders Matter," http:\\dooringalertsystems.com, printed Oct. 4, 2017, 16 pages.

Filippelli, Mario et al., "Respiratory dynamics during laughter," J Appl Physiol, (90), 1441-1446, Apr. 2001, http://iap.physiology.org/content/jap/90/4/1441.full.pdf.

Fox, Ben, "The Simple Technique That Could Save Cyclists' Lives," https://www.outsideonline.com/2115116/simple-technique-could-save-cyclists-lives, Sep. 19, 2016, 6 pages.

Gu, Changzhan et al., "Assessment of Human Respiration Patterns via Noncontact Sensing Using Doppler Multi-Radar System", Sensors Mar. 2015, 15(3), 6383-6398, doi: 10.3390/s150306383, 17 pages.

Guercan, Yalin "Super-resolution Algorithms for Joint Range-Azimuth-Doppler Estimation in Automotive Radars," Technische Universitet Delft, TUDelft University of Technology Challenge the Future, Jan. 25, 2017, 72 pages.

Inac, Ozgur et al., "A Phased Array RFIC with Built-In Self-Test Capabilities," IEEE Transactions on Microwave Theory and Techniques, vol. 60, No. 1, Jan. 2012, 10 pages.

Killedar, Abdulraheem "XWR1xxx Power Management Optimizations—Low Cost LC Filter Solution," Application Report SWRA577, Texas Instruments, Oct. 2017, 19 pages.

Kizhakkel, V., "Pulsed Radar Target Recognition Based on Micro-Doppler Signatures Using Wavelet Analysis", A Thesis, Graduate Program in Electrical and Computer Engineering, Ohio State University, Jan. 2013-May 2013, 118 pages.

Kuehnke, Lutz, "Phased Array Calibration Procedures Based on Measured Element Patterns," 2001 Eleventh International Conference on Antennas and Propagation, IEEE Conf., Publ. No. 480, Apr. 17-20, 2001, 4 pages.

Lim, Soo-Chul et al., "Expansion of Smartwatch Touch Interface from Touchscreen to Around Device Interface Using Infrared Line Image Sensors," Sensors 2015, ISSN 1424-8220, vol. 15, 16642-16653, doi:10.3390/s150716642, www.mdpi.com/journal/sensors, Jul. 15, 2009, 12 pages.

Lin, Jau-Jr et al., "Design of an FMCW radar baseband signal processing system for automotive application," SpringerPlus a SpringerOpen Journal, (2016) 5:42, http://creativecommons.org/licenses/by/4.0/, DOI 10.1186/s40064-015-1583-5; Jan. 2016, 16 pages.

Microwave Journal Frequency Matters, "Single-Chip 24 GHz Radar Front End," Infineon Technologies AG, www.microwavejournal.com/articles/print/21553-single-chip-24-ghz-radar-front-end, Feb. 13, 2014, 2 pages.

Qadir, Shahida G., et al., "Focused ISAR Imaging of Rotating Target in Far-Field Compact Range Anechoic Chamber," 14th International Conference on Aerospace Sciences & Aviation Technology, ASAT-14-241-IP, May 24-26, 2011, 7 pages.

Richards, Mark A., "Fundamentals of Radar Signal Processing," McGraw Hill Electronic Engineering, ISBN: 0-07-144474-2, Jun. 2005, 93 pages.

Schroff, Florian et al., "FaceNet: A Unified Embedding for Face Recognition and Clustering," CVF, CVPR2015, IEEE Computer Society Conference on Computer Vision and Pattern Recognition; Mar. 12, 2015, pp. 815-823.

Simon, W., et al., "Highly Integrated KA-Band Tx Frontend Module Including 8x8 Antenna Array," IMST GmbH, Germany, Asia Pacific Microwave Conference, Dec. 7-10, 2009, 63 pages.

Suleymanov, Suleyman, "Design and Implementation of an FMCW Radar Signal Processing Module for Automotive Applications," Master Thesis, University of Twente, Aug. 31, 2016, 61 pages.

Thayananthan, T. et al., "Intelligent target recognition using micro-Doppler radar signatures," Defence R&D Canada, Radar Sensor Technology III, Proc. of SPIE, vol. 7308, 730817, Dec. 9, 2009, 11 pages.

Thayaparan, T. et al., "Micro-Doppler Radar Signatures for Intelligent Target Recognition," Defence Research and Development Canada, Technical Memorandum, DRDC Ottawa TM 2004-170, Sep. 2004, 73 pages.

Wilder, Carol N., et al., "Respiratory patterns in infant cry," Canada Journal of Speech, Human Communication Winter, 1974-75, http://cjslpa.ca/files/1974_HumComm_Vol_01/No_03_2-60/Wilder_Baken_HumComm_1974.pdf, pp. 18-34.

Xin, Qin et al., "Signal Processing for Digital Beamforming FMCW SAR," Hindawi Publishing Corporation, Mathematical Problems in Engineering, vol. 2014, Article ID 859890, http://dx.doi.org/10.1155/2014/859890, 11 pages.

Chen, Xiaolong et al., "Detection and Extraction of Target with Micromotion in Spiky Sea Clutter via Short-Time Fractional Fourier Transform", IEEE Transactions on Geoscience and Remote Sensing, vol. 52, No. 2, Feb. 2014, pp. 1002-1018.

* cited by examiner

| Objects | Macro-Doppler (Large Bodily Movements) | Micro-Doppler (Small Bodily Movements) | Vital-Doppler (Vital Signs) |
|---|---|---|---|
| Furniture (112) | No | No | No |
| Fan (114) | Yes | N/A | No |
| Running Human (116-1) | Yes | N/A | Yes |
| Static Human (116-2) | No | Yes | Yes |
| Human ascending stairs (116-3) | Yes | N/A | Yes |
| Human watching TV (116-4) | No | Yes | Yes |
| Human descending stairs (116-5) | Yes | N/A | Yes |
| Human conversing (116-6) | No | Yes | Yes |
| Human eating (116-7) | No | Yes | Yes |
| Human walking (116-8) | Yes | N/A | Yes |
| Human sleeping (116-9) | No | No | Yes |
| Human cooking (116-10) | No | Yes | Yes |
| Human working at computer (116-11) | No | Yes | Yes |

SYSTEM AND METHOD FOR HUMAN BEHAVIOR MODELLING AND POWER CONTROL USING A MILLIMETER-WAVE RADAR SENSOR

TECHNICAL FIELD

The present disclosure relates generally to a system and method for human behavior modelling and power control using a millimeter-wave radar sensor.

BACKGROUND

Applications in the millimeter-wave frequency regime have gained significant interest in the past few years due to the rapid advancement in low cost semiconductor technologies such as silicon germanium (SiGe) and fine geometry complementary metal-oxide semiconductor (CMOS) processes. Availability of high-speed bipolar and metal-oxide semiconductor (MOS) transistors has led to a growing demand for integrated circuits for millimeter-wave applications at 60 GHz, 77 GHz, and 80 GHz and also beyond 100 GHz. Such applications include, for example, automotive radar systems and multi-gigabit communication systems.

In some radar systems, the distance between the radar and a target is determined by transmitting a frequency modulated signal, receiving a reflection of the frequency modulated signal, and determining a distance based on a time delay and/or frequency difference between the transmission and reception of the frequency modulated signal. Accordingly, some radar systems include a transmit antenna to transmit the RF signal, a receive antenna to receive the RF, as well as the associated RF circuitry used to generate the transmitted signal and to receive the RF signal. In some cases, multiple antennas may be used to implement directional beams using phased array techniques. A MIMO configuration with multiple chipsets can be used to perform coherent and non-coherent signal processing, as well.

RF signals received by a radar system may be processed to determine a variety of parameters, examples of which include determining the presence or number of human beings or inanimate objects within an area and classifying the behavior of human beings or inanimate objects within the area. Efficient methods of processing RF signals received by a radar system may be needed.

SUMMARY

An embodiment method includes identifying a set of targets within a field of view of a millimeter-wave radar sensor based on radar data received by the millimeter-wave radar sensor; capturing radar data corresponding to the set of targets across a macro-Doppler frame; performing macro-Doppler processing on the macro-Doppler frame and determining whether a macro-Doppler signal is present in the macro-Doppler frame based on the macro-Doppler processing; capturing radar data corresponding to the set of targets across a micro-Doppler frame, wherein the micro-Doppler frame has a duration equal to a first plurality of macro-Doppler frames; performing micro-Doppler processing on the micro-Doppler frame and determining whether a micro-Doppler signal is present in the micro-Doppler frame based on the micro-Doppler processing; and activating at least one range bin of a plurality of range bins in response to a determination that at least one of the macro-Doppler signal or the micro-Doppler signal is present.

An embodiment system includes a processing system configured to be coupled to a millimeter-wave radar sensor. The processing system is configured to instruct the millimeter-wave radar sensor to transmit a series of chirps within a field of view of the millimeter-wave radar sensor; identify a set of targets within the field of view based on radar data received by the millimeter-wave radar sensor and in response to transmission of the series of chirps; capture radar data corresponding to the set of targets across a macro-Doppler frame; perform macro-Doppler processing on the macro-Doppler frame within a first range of frequencies and determine whether a macro-Doppler signal is present in the macro-Doppler frame based on the macro-Doppler processing; capture radar data corresponding to the set of targets across a micro-Doppler frame, wherein the micro-Doppler frame has a duration equal to a first plurality of macro-Doppler frames; perform micro-Doppler processing on the micro-Doppler frame within a second range of frequencies orthogonal to the first range of frequencies and determine whether a micro-Doppler signal is present in the micro-Doppler frame based on the micro-Doppler processing; and activate at least one range bin of a plurality of range bins in response to a determination that at least one of the macro-Doppler signal or the micro-Doppler signal is present.

An embodiment executable program, stored on a non-transitory computer readable storage medium, includes instructions to instruct a millimeter-wave radar sensor to transmit a series of chirps within a field of view of the millimeter-wave radar sensor; identify a set of targets within the field of view based on radar data received by the millimeter-wave radar sensor and in response to transmission of the series of chirps; capture radar data corresponding to the set of targets across a macro-Doppler frame; perform macro-Doppler processing on the macro-Doppler frame and determining whether a macro-Doppler signal is present in the macro-Doppler frame based on the macro-Doppler processing; capture radar data corresponding to the set of targets across a micro-Doppler frame, wherein the micro-Doppler frame has a duration equal to a first plurality of macro-Doppler frames; perform micro-Doppler processing on the micro-Doppler frame and determining whether a micro-Doppler signal is present in the micro-Doppler frame based on the micro-Doppler processing; and activate at least one range bin of a plurality of range bins in response to a determination that at least one of the macro-Doppler signal or the micro-Doppler signal is present.

BRIEF DESCRIPTION OF THE DRAWINGS

For a more complete understanding of the present invention, and the advantages thereof, reference is now made to the following descriptions taken in conjunction with the accompanying drawings, in which:

FIG. 1B illustrates a table showing an example of how objects are classified by an embodiment radar-based detection system;

FIGS. 9A-9D show relative frame structures of macro-Doppler frames, micro-Doppler frames, and vital-Doppler frames during various power modes, in accordance with an embodiment;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope.

The present invention will be described with respect to preferred embodiments in a specific context, namely a system and method for detection, human behavior modeling, and power control using a millimeter-wave radar sensor. The invention may also be applied to other RF-based systems and applications that detect the presence of one or more objects. In embodiments of the present invention, simplified methods of detecting macro-Doppler, micro-Doppler, and vital-Doppler signatures are provided. Millimeter-wave radar is used to target multiple Doppler scenarios by segregating them under different frames and a single millimeter-wave radar sensor is used within one frame (e.g. instead of multiple sensors in conventional methods).

Figure 1A:
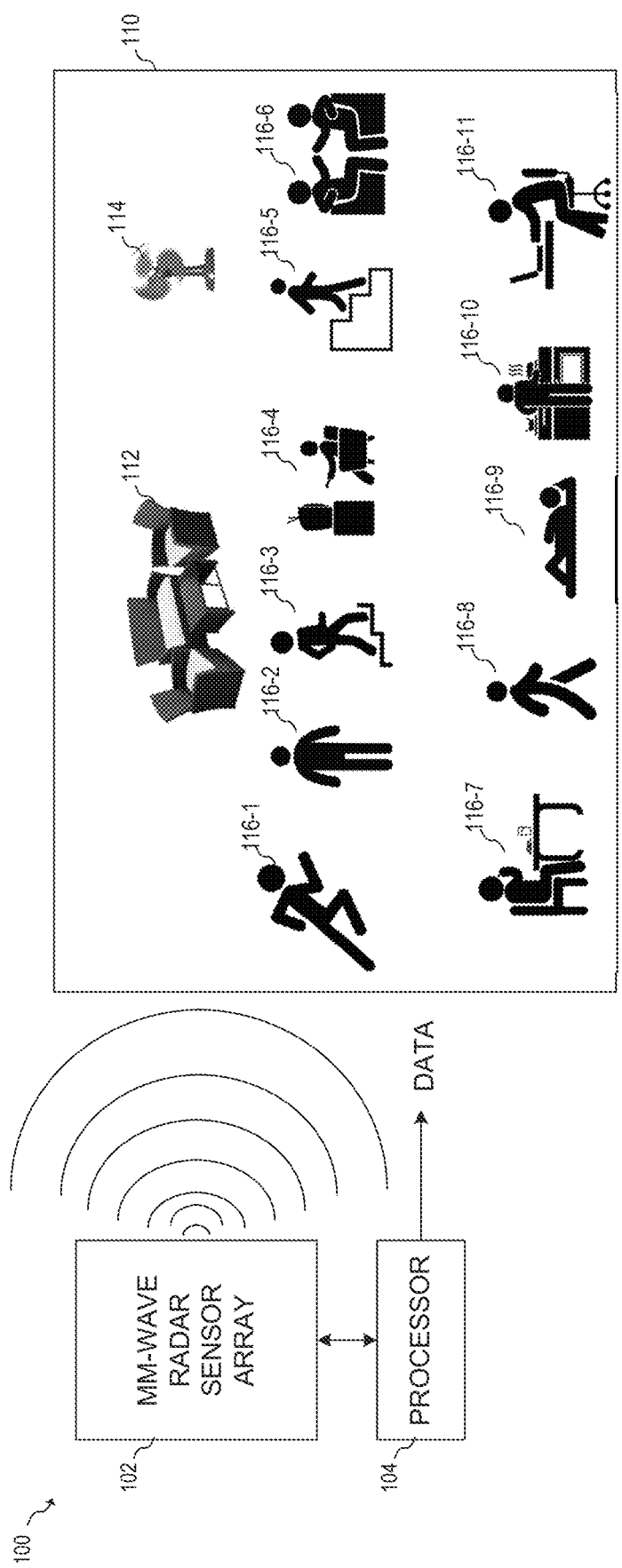
FIG. 1A illustrates an embodiment radar-based detection system.

FIG. 1A illustrates a block diagram of radar-based detection system 100, in accordance with an embodiment. As shown in FIG. 1A, radar-based detection system 100 includes a millimeter-wave radar sensor 102 and a processor 104 that controls the operation of millimeter-wave radar sensor 102. The processor 104 performs various radar signal processing operations on the data produced by millimeter-wave radar sensor 102. During operation, millimeter-wave radar sensor 102 transmits millimeter-wave RF signals that are reflected by various objects 112, 114, and 116-1 to 116-11 that are present within an area 110. The area 110 represents any finite area within the field-of-view of the millimeter-wave radar sensor 102 and may represent, for example, a conference room, office, automobile, store, public area, private area, or any other physical area in which the presence of objects may be detected by the millimeter-wave radar sensor 102.

Millimeter-wave RF signals reflected by the objects 112, 114, and 116-1 to 116-11 are received by the millimeter-wave radar sensor 102. The received RF signals are converted to a digital representation, for example, by an analog-to-digital converter included in the millimeter-wave radar sensor 102 or coupled between the millimeter-wave radar sensor 102 and the processor 104. The digital representation of the received RF signals may be processed by the processor 104 for at least one of the following purposes: (1) determining the presence of human beings 116-1 to 116-11 within the area 110 (e.g. for purposes of adaptive power control of devices within the area 110); (2) determining the number of human beings 116-1 to 116-11 within area 110 (e.g. for purposes of counting people within area 110 or adaptive power control of devices within the area 110); and (3) classifying the behavior of human beings 116-1 to 116-11 within area 110 (e.g. for purposes of adaptive power control of devices within area 110). The result of this processing produces various data (represented in FIG. 1A by signal DATA) that may be indicative of the presence of human beings 116-1 to 116-11 within the area 110, the number of human beings 116-1 to 116-11 within the area 110, and/or a classification of the behavior of human beings 116-1 to 116-11 within the area 110. In the embodiment of FIG. 1A, the objects 112, 114, and 116-1 to 116-11 within the area 110 are represented as furniture 112, a fan 114, and various human beings 116-1 to 116-11 engaged in a variety of activities. It should be understood that in the various embodiments of the present invention, other object types can be detected by embodiment radar-based detection systems. For example, embodiment radar-based detection systems can be used to detect the presence and count the number of animals, robots, machinery and other objects within the area 110.

Objects 112, 114, and 116-1 to 116-11 are detected and classified using macro-Doppler analysis, micro-Doppler analysis and/or vital-Doppler analysis of the RF signals received by the millimeter-wave radar sensor 102. In some embodiments, such macro-Doppler, micro-Doppler, and vital-Doppler analysis of the received RF signals may be performed on the digital representation of the received RF signals. In general, macro-Doppler analysis may be used to determine gross or large-amplitude motion of each object 112, 114, and 116-11 to 116-11 (e.g. large bodily movements of a human being); micro-Doppler analysis may be used to determine small-amplitude motion of each object 112, 114, and 116-1 to 116-11 (e.g. small bodily movements of a human being); and vital-Doppler analysis may be used to detect vital signs of each object 112, 114, and 116-11 to 116-11 (e.g. cardiac or respiratory signals of a human being).

In embodiments that utilize a frequency modulated continuous wave (FMCW) radar sensor, the location of each object 112, 114, and 116-1 to 116-11 within the area 110 may be found by taking a range fast Fourier transform (FFT) of the baseband radar signal produced by the millimeter-wave radar sensor 102, and the motion of the various objects may be determined, for example, by taking a further FFTs to determine each object's velocity using Doppler analysis techniques known in the art. In embodiments in which the millimeter-wave radar sensor 102 includes a receive antenna array, further FFTs may also be used to determine the azimuth of each object 112, 114, and 116-1 to 116-11 with respect to the millimeter-wave radar sensor 102. In the example illustrated in FIG. 1A and with regards to macro-Doppler techniques, furniture 112 may be identified as being a static object, the fan 114 is identified as being a moving object, the static human being 116-2 is identified as being a static object, and the moving human being 116-1 is identified as being a moving object. With regards to micro-Doppler and vital-Doppler techniques, small detected motions are analyzed to determine whether these motions are indicative of small bodily movements or the heart rate and respiration of a human being. During micro-Doppler and vital-Doppler steps, the millimeter-wave radar sensor 102 makes a series of radar measures that are more specifically directed toward each object 112, 114, and 116-1 to 116-11. For example, in embodiments in which the millimeter-wave radar sensor 102 includes a transmit antenna array, these directed measurements are performed by steering the radar beam produced by the millimeter-wave radar sensor 102 using phase-array radar techniques. Based on these more directed radar measurements made during micro-Doppler and vital-Doppler steps, the processor 104 determines whether each object 112, 114, and 116-1 to 116-11 experiences small motions consistent with human vital signs such as heart rate and respiration.

FIG. 1B illustrates a table showing a summary of how an embodiment millimeter-wave-based radar system 100 might classify objects 112, 114, 116 and 120 shown in FIG. 1A. As shown, furniture 112 does not exhibit large-scale movements, small-scale movements, or human-like vital signs. As such, furniture 112 may be classified as a non-moving inanimate object. On the other hand, the fan 114 is recognized as a moving object, but does not exhibit human-like vital signs as measured by the millimeter-wave radar sensor 102. Consequently, the fan 114 may be classified as a moving inanimate object. The running human being 116-1 is recognized as exhibiting large bodily movements and having vital signs, while the static human being 116-2 is not recognized as a moving object but exhibits human-like vital signs. As such, both the running human being 116-1 and the static human being 116-2 are classified as being human beings (e.g. based on the detection of human-like vital signs using vital-Doppler analysis). The details of the macro-Doppler, micro-Doppler, and vital-Doppler analyses performed by the processor 104 are discussed below with reference to FIG. 3.

Figure 2A:
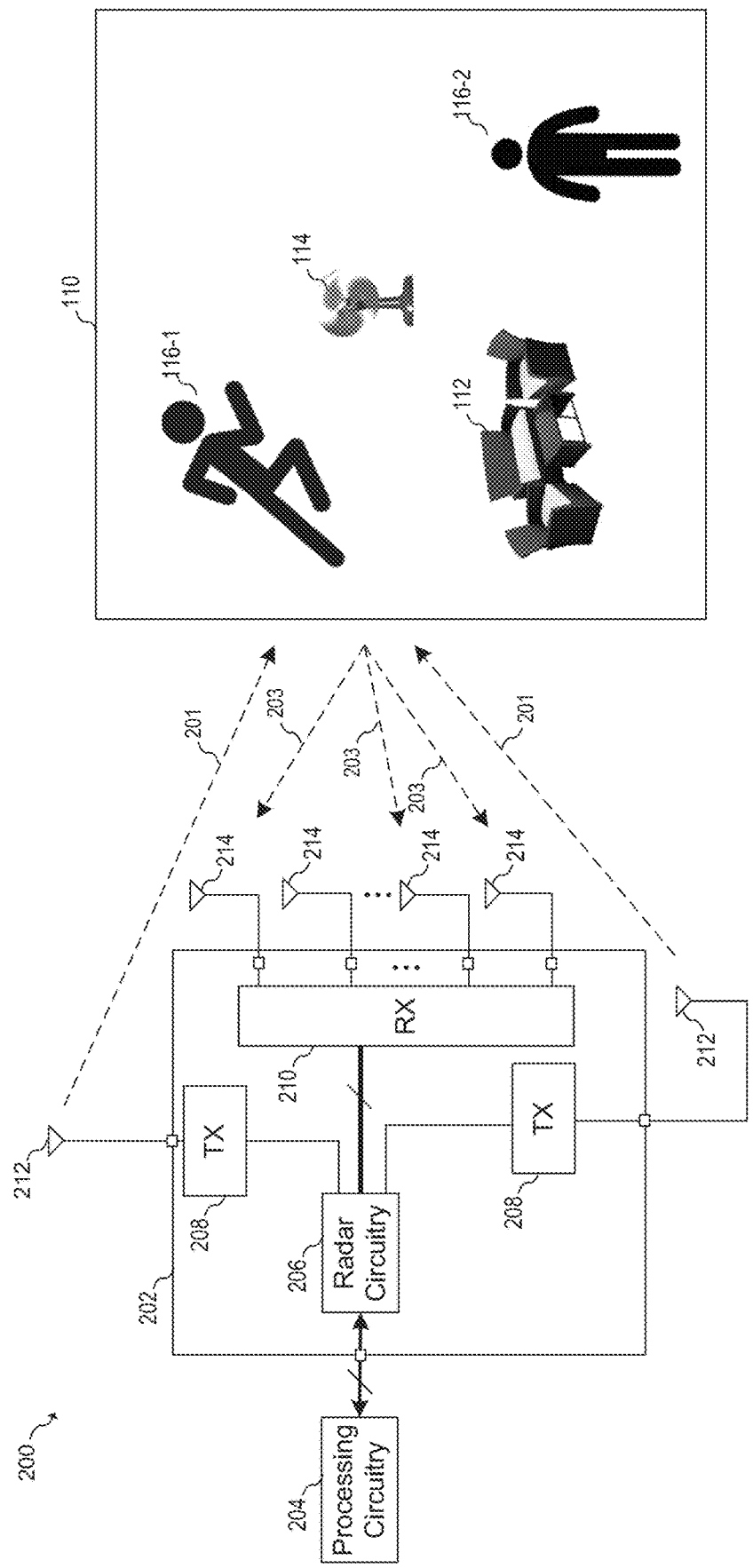
FIG. 2A illustrates a block diagram of an embodiment millimeter-wave radar sensor.

FIG. 2A illustrates a block diagram of a millimeter-wave radar sensor system 200 that may be used to implement millimeter-wave radar sensor circuits in the various disclosed embodiments. Millimeter-wave radar sensor system 200 includes a millimeter-wave radar sensor circuit 202 and processing circuitry 204. Embodiment millimeter-wave radar sensor circuits may be implemented, for example, using a two-dimensional millimeter-wave phase-array radar that measures the position and relative speed of objects 112, 114, and 116-1 to 116-11 (for simplicity, only human beings 116-1 and 116-2 are shown in FIG. 2A). The millimeter-wave phase-array radar transmits and receives signals in the 20 GHz to 122 GHz range. Alternatively, frequencies outside of this range may also be used. In some embodiments, the millimeter-wave radar sensor circuit 202 operates as a frequency modulated continuous wave (FMCW) radar sensor having multiple transmit and receive channels. Alternatively, other types of radar systems may be used such as pulse radar, Monte Carlo forecasting of waves (MCFW), and non-linear frequency modulation (NLFM) to implement millimeter-wave radar sensor circuit 202.

The millimeter-wave radar sensor circuit 202 transmits and receives radio signals for detecting the presence and motion of objects 112, 114, and 116-1 to 116-11 in three-dimensional space. For example, the millimeter-wave radar sensor circuit 202 transmits an incident RF signals 201 and receives RF signals 203 that are reflection of the incident RF signals from one or more of the objects 112, 114, and 116-1 to 116-11. The received reflected RF signals 203 are down-converted by the millimeter-wave radar sensor circuit 202 to determine beat frequency signals. These beat frequency signals may be used to determine information such as the location, speed, angle, etc., of the objects 112, 114, and 116-1 to 116-11 in three-dimensional space.

In various embodiments, the millimeter-wave radar sensor circuit 202 is configured to transmit incident RF signals 201 toward the objects 112, 114, and 116-1 to 116-11 via transmit antennas 212 and to receive reflected RF signals 203 from the objects 112, 114, and 116-1 to 116-11 via receive antennas 214. The millimeter-wave radar sensor circuit 202 includes transmitter front-end circuits 208 coupled to transmit antennas 212 and receiver front-end circuit 210 coupled to receive antennas 214.

During operation, transmitter front-end circuits 208 may transmit RF signals toward the objects 112, 114, and 116-1 to 116-11 simultaneously or individually using beamforming depending on the phase of operation. While two transmitter front-end circuits 208 are depicted in FIG. 2A, it should be appreciated that millimeter-wave radar sensor circuit 202 may include greater than two transmitter front-end circuits 208. Thus, in various embodiments, the number of transmitters can be extended to n×m. Each transmitter front-end circuit 208 includes circuitry configured to produce the incident RF signals. Such circuitry may include, for example, RF oscillators, up-converting mixers, RF amplifiers, variable gain amplifiers, filters, transformers, power splitters, and other types of circuits.

Receiver front-end circuit 210 receives and processes the reflected RF signals from the objects 112, 114, and 116-1 to 116-11. As shown in FIG. 2A, receiver front-end circuit 210 is configured to be coupled to four receive antennas 214, which may be configured, for example, as a 2×2 antenna array. In alternative embodiments, receiver front-end circuit 210 may be configured to be coupled to greater or fewer than four antennas, with the resulting antenna array being of various n×m dimensions depending on the specific embodiment and its specifications. Receiver front-end circuit 210 may include, for example, RF oscillators, up-converting mixers, RF amplifiers, variable gain amplifiers, filters, transformers, power combiners and other types of circuits.

Radar circuitry 206 provides signals to be transmitted to transmitter front-end circuits 208, receives signals from receiver front-end circuit 210, and may be configured to control the operation of millimeter-wave radar sensor circuit 202. In some embodiments, radar circuitry 206 includes, but is not limited to, frequency synthesis circuitry, up-conversion and down-conversion circuitry, variable gain amplifiers, analog-to-digital converters, digital-to-analog converters, digital signal processing circuitry for baseband signals, bias generation circuits, and voltage regulators.

Radar circuitry 206 may receive a baseband radar signal from processing circuitry 204 and control a frequency of an RF oscillator based on the received baseband signal. In some embodiments, this received baseband signal may represent a FMCW frequency chip to be transmitted. Radar circuitry 206 may adjust the frequency of the RF oscillator by applying a signal proportional to the received baseband signal to a frequency control input of a phase locked loop. Alternatively, the baseband signal received from processing circuitry 204 may be up-converted using one or more mixers. Radar circuitry 206 may transmit and digitize baseband signals via a digital bus (e.g., a USB bus), transmit and receive analog signals via an analog signal path, and/or transmit and/or receive a combination of analog and digital signals to and from processing circuitry 204.

Processing circuitry 204 acquires baseband signals provided by radar circuitry 206 and formats the acquired baseband signals for transmission to an embodiment signal processing unit. These acquired baseband signals may represent beat frequencies, for example. In some embodiments, processing circuitry 204 includes a bus interface (not shown) for transferring data to other components within the radar-based detection system. Optionally, processing circuitry 204 may also perform signal processing steps used by embodiment detection systems such as an FFT, a short-time Fourier transform (STFT), macro-Doppler analysis, micro-Doppler analysis, vital-Doppler analysis, object classification, machine learning, and the like. In addition to processing the acquired baseband signals, processing circuitry 204 may also control aspects of millimeter-wave radar sensor circuit 202, such as controlling the transmissions produced by millimeter-wave radar sensor circuit 202.

The various components of millimeter-wave radar sensor system 200 may be partitioned in various ways. For example, millimeter-wave radar sensor circuit 202 may be implemented on one or more RF integrated circuits (RFICs), antennas 212 and 214 may be disposed on a circuit board, and processing circuitry 204 may be implemented using a processor, a microprocessor, a digital signal processor and/or a custom logic circuit disposed on one or more integrated circuits/semiconductor substrates. Processing circuitry 204 may include a processor that executes instructions in an executable program stored in a non-transitory computer readable storage medium, such as a memory to perform the functions of processing circuitry 204. In some embodiments, however, all or part of the functionality of processing circuitry 204 may be incorporated on the same integrated circuit/semiconductor substrate on which millimeter-wave radar sensor circuit 202 is disposed.

In some embodiments, some or all portions of millimeter-wave radar sensor circuit 202 may be implemented in a package that contains transmit antennas 212, receive antennas 214, transmitter front-end circuits 208, receiver front-end circuit 210, and/or radar circuitry 206. In some embodiments, millimeter-wave radar sensor circuit 202 may be implemented as one or more integrated circuits disposed on a circuit board, and transmit antennas 212 and receive antennas 214 may be implemented on the circuit board adjacent to the integrated circuits. In some embodiments, transmitter front-end circuits 208, receiver front-end circuit 210, and radar circuitry 206 are formed on a same radar front-end integrated circuit (IC) die. Transmit antennas 212 and receive antennas 214 may be part of the radar front-end IC die, or may be implemented as separate antennas disposed over or adjacent to the radar front-end IC die. The radar front-end IC die may further include conductive layers, such as redistribution layers (RDLs), used for routing and/or for the implementation of various passive or active devices of millimeter-wave radar sensor circuit 202. In an embodiment, transmit antennas 212 and receive antennas 214 may be implemented using the RDLs of the radar front-end IC die.

Figure 2B:
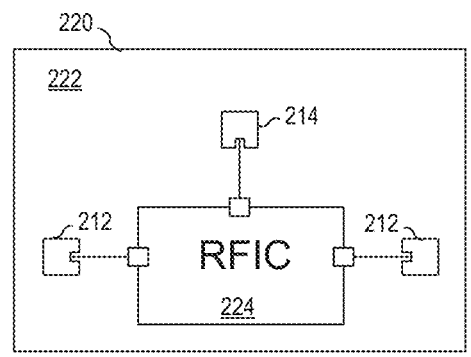
FIGS. 2B and 2C illustrate plan views of embodiment millimeter-wave radar sensor circuits.

FIG. 2B illustrates a plan view of millimeter-wave radar sensor circuit 220 that may be used to implement millimeter-wave radar sensor circuit 202. As shown, millimeter-wave radar sensor circuit 220 is implemented as an RFIC 224 coupled to transmit antennas 212 and receive antenna 214 implemented as patch antennas disposed on or within substrate 222. In some embodiments, substrate 222 may be implemented using a circuit board on which millimeter-wave radar sensor circuit 202 is disposed and on which transmit antennas 212 and receive antennas 214 are implemented using conductive layers of the circuit board. Alternatively, substrate 222 represents a wafer substrate on which one or more RDLs are disposed and on which transmit antennas 212 and receive antennas 214 are implemented using conductive layers on the one or more RDLs.

Figure 2C:
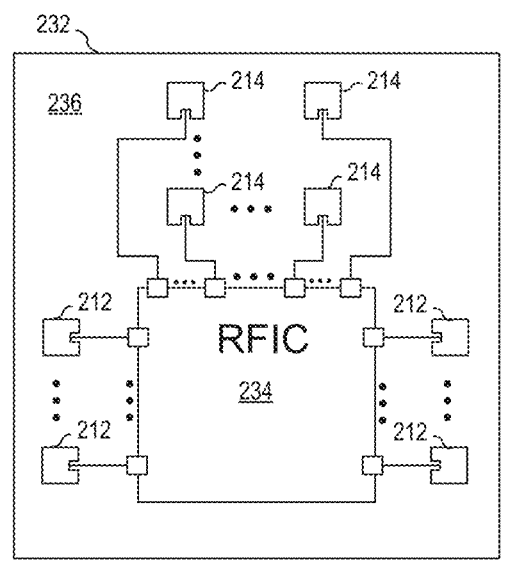

FIG. 2C illustrates a plan view of millimeter-wave radar sensor circuit 232 that includes an array of transmit antennas 212 and an array of receive antennas 214 coupled to RFIC 234 disposed on substrate 236. In various embodiments, transmit antennas 212 may form an array of m antennas and receive antennas 214 may form an array of n antennas. Each of the m transmit antennas 212 are coupled to a corresponding pin on RFIC 234 and coupled to a corresponding transmit circuit within RFIC 234; and each of the n receive antennas 214 are coupled to a corresponding pin on RFIC 234 and coupled to a corresponding receive circuit within RFIC 234. In various embodiments, the array of transmit antennas 212 and the array of receive antennas 214 may be implemented as a uniform array or a linear array of any dimension. It should be appreciated that the implementations of FIGS. 2B and 2C are just two examples of the many ways that embodiment millimeter-wave radar sensor circuits could be implemented.

Figure 3:
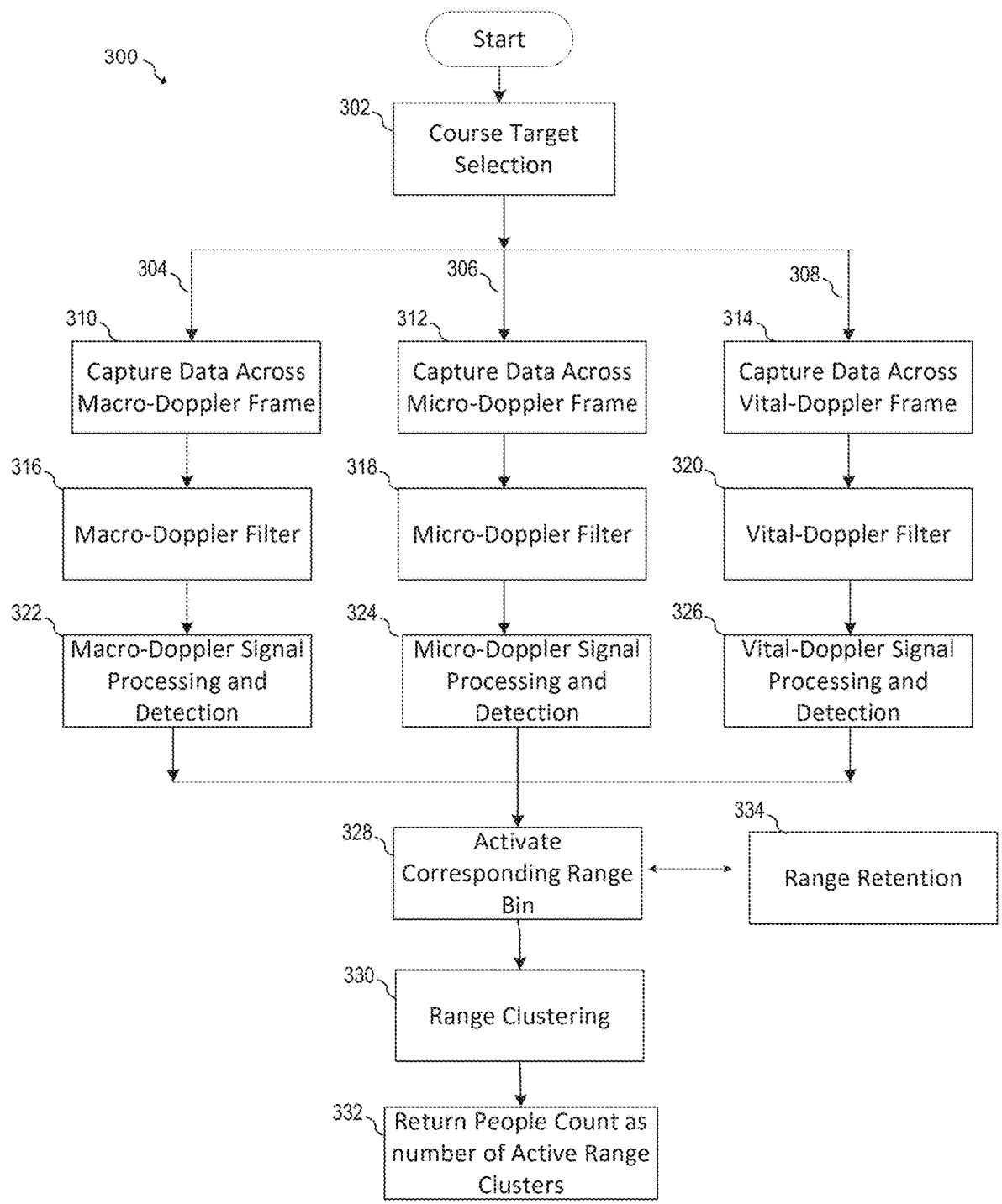
FIG. 3 illustrates a block diagram of a method for detecting the number of human beings within an area, in accordance with an embodiment.

FIG. 3 illustrates a block diagram of a method 300 for detecting the number of human beings within the area 110, in accordance with an embodiment. The method 300 may be used for at least one of the following purposes: (1) determining the presence of human beings 116-1 to 116-11 within the area 110 (e.g. for purposes of adaptive power control of devices within the area 110); (2) determining the number of human beings 116-1 to 116-11 within area 110 (e.g. for purposes of counting people within area 110 or adaptive power control of devices within the area 110); and (3) classifying the behavior of human beings 116-1 to 116-11 within area 110 (e.g. for purposes of adaptive power control of devices within area 110). The method 300 may be performed on digital radar data, which may be produced by an analog-to-digital convertor included in or coupled to the millimeter-wave radar sensor 102.

In step 302, a coarse target selection is performed in which a first set of targets are identified using a millimeter-wave radar sensor such as millimeter-wave radar sensors 102, 202, 220 and 232 shown in FIGS. 1A, 2A, 2B and 2C, respectively. In various embodiments that utilize FMCW radar, an FFT is taken of the baseband radar system and objects are identified within various range gates. In some embodiments, such as those that use multiple receive antennas, additional FFTs are performed to resolve detected objects across azimuth as well as range. During coarse target selection step 302, multiple chirps may be transmitted and received by the millimeter-wave radar sensor.

Figure 4:
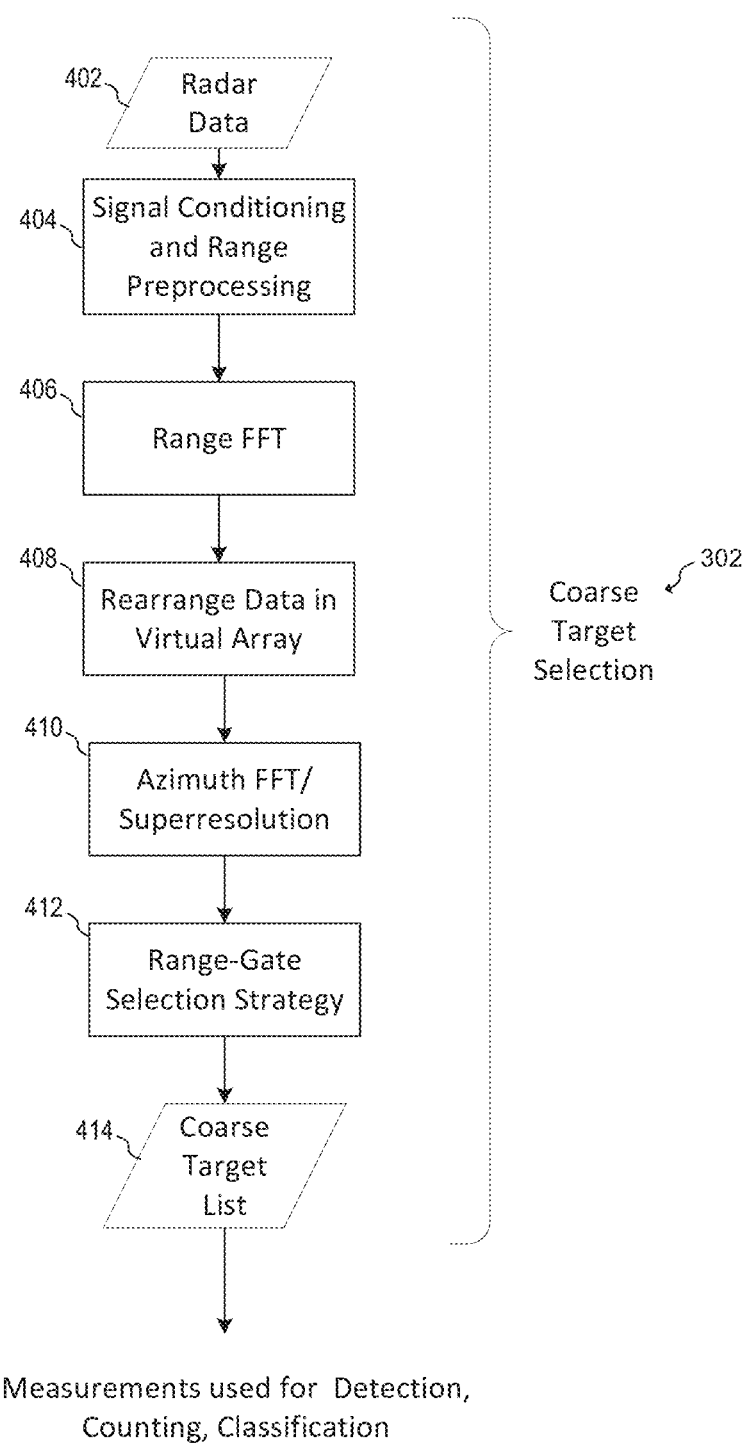
FIG. 4 shows, in greater detail, the various steps that may be executed during a coarse target selection step of the method shown in FIG. 3, in accordance with an embodiment.

FIG. 4 shows, in greater detail, the various steps that may be executed during the coarse target selection step 302 shown in FIG. 3, in accordance with an embodiment. The coarse target selection step 302 begins with reception of radar data (in step 402) by the millimeter-wave radar sensor. To obtain the radar data, a series of chirps is transmitted and subsequently received by a millimeter-wave radar sensor, such as millimeter-wave radar sensors 102, 202, 220 and 232 shown in FIGS. 1A, 2A, 2B and 2C, respectively. These radar measurements, which can include baseband beat frequencies, are digitized and stored as radar data 402.

In step 404, signal conditioning and range preprocessing is performed. During step 404, radar data 402 is filtered, DC components are removed, and the IF data is cleared. In some embodiments, IF data is cleared by filtering to remove the Tx-Rx self-interference and optionally pre-filtering the interference colored noise. In some embodiments, filtering includes removing data outliers that have significantly different values from other neighboring range-gate measurements. In a specific example, a Hampel filter is applied with a sliding window at each range-gate to remove such outliers. Alternatively, other filtering for range preprocessing known in the art may be used.

In step 406, a range FFT is taken of the filtered radar data produced by step 404. In an embodiment, a windowed FFT having a length of the chirp (e.g., 256 samples) may be calculated along each waveform for the data resulting from the first scanning, or may be calculated for data corresponding to a portion of the first scanning performed during step 401. Each point of the range FFT represents a distance between the millimeter-wave sensor and a detected object and corresponds to a range gate. In some embodiments, a range FFT is performed for radar data produced by each receive antenna in a receive antenna array.

In step 408, the data produced by range FT step 406 is rearranged in a virtual array. Here, multiple receiver data is stitched together for improved angular resolution using methods known in the art. In step 410, an azimuth FFT is performed on the virtual array data produced in step 408 using higher order beamforming and super-resolution techniques known in the art. In various embodiments, the range FFT provides an indication as to the angular location of the detected objects with respect to the position of the millimeter-wave radar sensor. In alternative embodiments, other transform types could be used besides an FFT for the range and azimuth FFTs of steps 406 and 410, such as a Discrete Fourier Transform (DFT) or other transform types such as a z-transform.

In step 412, a range-gate selection strategy is implemented in order to determine which range-gates represent detected objects. In some embodiments, range-gates whose mean is greater than the mean of all the other range gates in its field of view are selected as potential target range-gates. In various embodiments, the range-gate selection strategy also determines the angle or azimuth of detected targets with respect to the millimeter-wave radar sensor as well as their range or distance to the millimeter-wave radar sensor. Once it is determined which range gates represent detected objects, a coarse target list is produced (e.g. in step 414) that includes the range and azimuth of each detected object. The radar data corresponding to the course target list is subsequently provided to the macro-Doppler, micro-Doppler, and vital-Doppler processing methods (e.g. as described below in respect of FIGS. 3, 6, 7A-7B) for detection, counting, and classification.

Referring back to FIG. 3, following the course target selection step 302, parallel processing paths 304, 306, and 308 are implemented. Processing path 304 illustrates a macro-Doppler processing path; processing path 306 illustrates a micro-Doppler processing path; and processing path 308 illustrates a vital-Doppler processing path. It is noted that large-amplitude movements that can be detected by macro-Doppler processing—such as walking (e.g. by object 116-8), ascending stairs (e.g. by object 116-3), and descending stairs (e.g. by object 116-5)—are short in time (i.e., bursty), and thus, a short slow-time window or frame-size is sufficient for detecting or classifying such movements. On the other hand, small-amplitude movements that can be detected by micro-Doppler processing or vital-Doppler processing (but cannot be detected by macro-Doppler processing)—such as minor body movements made while breathing, watching TV, eating, cooking, or working on a computer—are less bursty compared to large-amplitude movements, and thus, a longer slow-time window or frame-size may be needed for detecting or classifying such movements. Furthermore, large-amplitude movements typically have higher velocity compared to small-amplitude movements, and thus, macro-Doppler processing requires closely spaced time samples for estimation, while micro-Doppler and vital-Doppler processing require larger window or frame-sizes to estimate minute Doppler motions. Additionally, detection of macro-Doppler, micro-Doppler, and vital-Doppler movements require different thresholds, center-frequencies, and bandwidths. The different (and sometimes competing) requirements for macro-Doppler, micro-Doppler, and vital-Doppler processing are overcome by parallelizing macro-Doppler processing, micro-Doppler processing, and vital-Doppler processing, as shown in FIG. 3. While the processing paths 304, 306, and 308 are shown as being performed in parallel in the example of FIG. 3, it is noted that this disclosure contemplates other embodiments (e.g. the example illustrated in FIG. 12) where these processing paths 304, 306, and 308 are executed sequentially.

Macro-Doppler processing path 304 includes step 310, where data is captured across each macro-Doppler frame. The data from each macro-Doppler frame is subsequently subjected to macro-Doppler filtering in step 316 using macro-Doppler filtering techniques known in the art. In some embodiments, at step 316, an FFT may be taken of the range bins over slow-time to determine the velocity of each detected object. Alternatively, the velocity of each object may be determined by other waveform techniques including, but not limited to triangular chirp and staggered pulse repetition time (PRT). It is noted that the macro-Doppler filtering step 316 may, as an alternative to the FFT approach, be performed by a bank of filters (e.g. described below in reference to FIG. 7A). In such embodiments, the macro-Doppler filtering step 316 may include use of a plurality of band-pass filters having cutoff frequencies between 2 kHz and 32 kHz. Filtered macro-Doppler data is subsequently processed and subjected to a detection algorithm in step 322. The detection algorithm executed in step 322 determines whether a human being is present in the area 110. Based on the result of the macro-Doppler detection algorithm, a corresponding range bin is activated (in step 328).

Micro-Doppler processing path 306 includes step 312, where data is captured across each micro-Doppler frame. The data from each micro-Doppler frame is subsequently subjected to micro-Doppler filtering in step 318 using micro-Doppler filtering techniques known in the art. In some embodiments, at step 318, an FFT may be taken of a range bins over slow-time to determine the velocity of each detected object. Alternatively, the velocity of each object may be determined by other waveform techniques including, but not limited to triangular chirp and staggered pulse repetition time (PRT). It is noted that the micro-Doppler filtering step 318 may, as an alternative to the FFT approach, be performed by a bank of filters (e.g. described below in reference to FIG. 7A). In such embodiments, the micro-Doppler filtering step 318 may include use of a plurality of band-pass filters having cutoff frequencies between 10 Hz and 2 kHz. Additionally, the spectrum of frequencies filtered by the macro-Doppler filtering step 316 and the micro-Doppler filtering step 318 are orthogonal (i.e., non-overlapping). Filtered micro-Doppler data is subsequently processed and subjected to a detection algorithm in step 324. The detection algorithm executed in step 324 determines whether a human being is present in the area 110. Based on the result of the micro-Doppler detection algorithm, a corresponding range bin is activated (in step 328).

Vital-Doppler processing path 308 includes step 314, where data is captured across each vital-Doppler frame. The data from each vital-Doppler frame is subsequently subjected to vital-Doppler filtering in step 320 using vital-Doppler filtering techniques discussed below in reference to FIG. 6. It is noted that the spectrum of frequencies filtered by the micro-Doppler filtering step 318 and the vital-Doppler filtering step 320 are orthogonal (i.e., non-overlapping). Filtered vital-Doppler data is subsequently processed and subjected to a detection algorithm in step 326. The detection algorithm executed in step 326 determines whether a human being is present in the area 110. Based on the result of the vital-Doppler detection algorithm, a corresponding range bin is activated (in step 328).

As discussed above, a short slow-time window or frame-size may be sufficient for measuring or detecting large-amplitude movements, while a longer slow-time window or frame-size may be needed for measuring or detecting small amplitude movements. Consequently, the macro-Doppler frame, micro-Doppler frame, and vital-Doppler frame structures differ in duration and constitution. Examples of the relative durations and constitutions of a macro-Doppler frame, a micro-Doppler frame, and a vital-Doppler frame are shown in FIGS. 5A-5D.

Figure 5A:
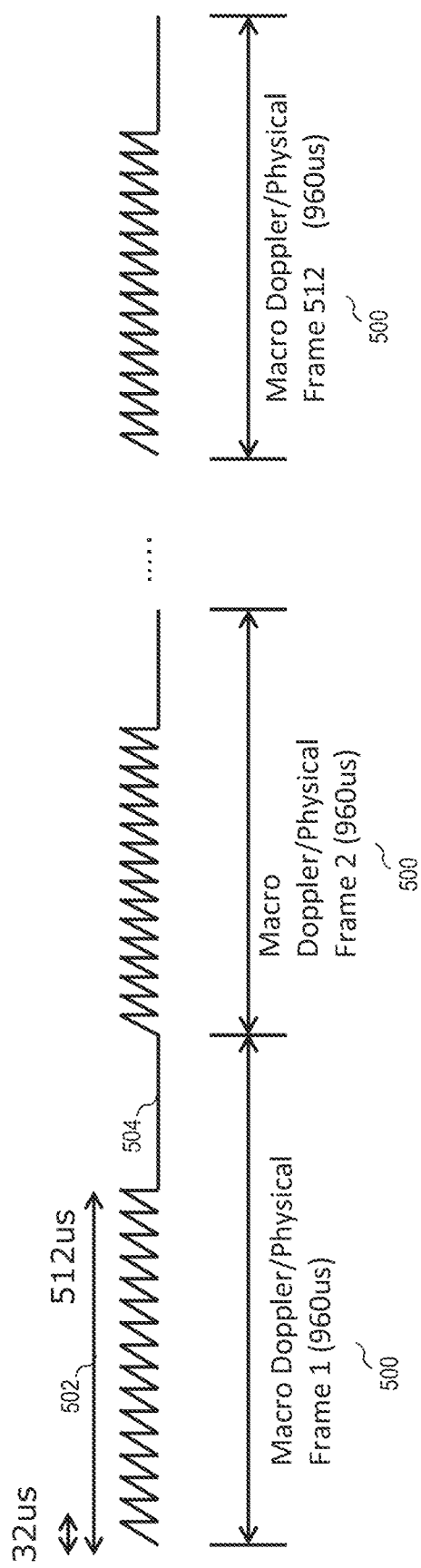
FIG. 5A shows a timing diagram illustrating the duration and constitution of each of a plurality of macro-Doppler frames, in accordance with an embodiment.

FIG. 5A shows a timing diagram illustrating the duration and constitution of each of a plurality of macro-Doppler frames 500, in accordance with an embodiment. In the example of FIG. 5A, 512 macro-Doppler frames are illustrated (labelled in FIG. 5A as "Frame 1," "Frame 2" and so on until "Frame 512"). Each macro-Doppler frame 500 includes a continuous sequence of transmitted chirps 502 followed in time by a transmission-free duration 504. In the example of FIG. 5A, the continuous sequence of transmitted chirps 502 includes 16 consecutive chirps, each having a period of 32 microseconds. Consequently, the continuous sequence of transmitted chirps 502 of each macro-Doppler frame is 512 microseconds in duration. The transmission-free duration 504 lasts for about 448 microseconds, thereby causing each macro-Doppler frame 500 to have a duration of about 960 microseconds. Based on these time durations, the macro-Doppler processing path 302 is capable of detecting a maximum Doppler frequency of 31.25 kHz with a 1.953 kHz frequency resolution. It is noted that these time durations are merely exemplary and may be different in other embodiments.

Figure 5B:
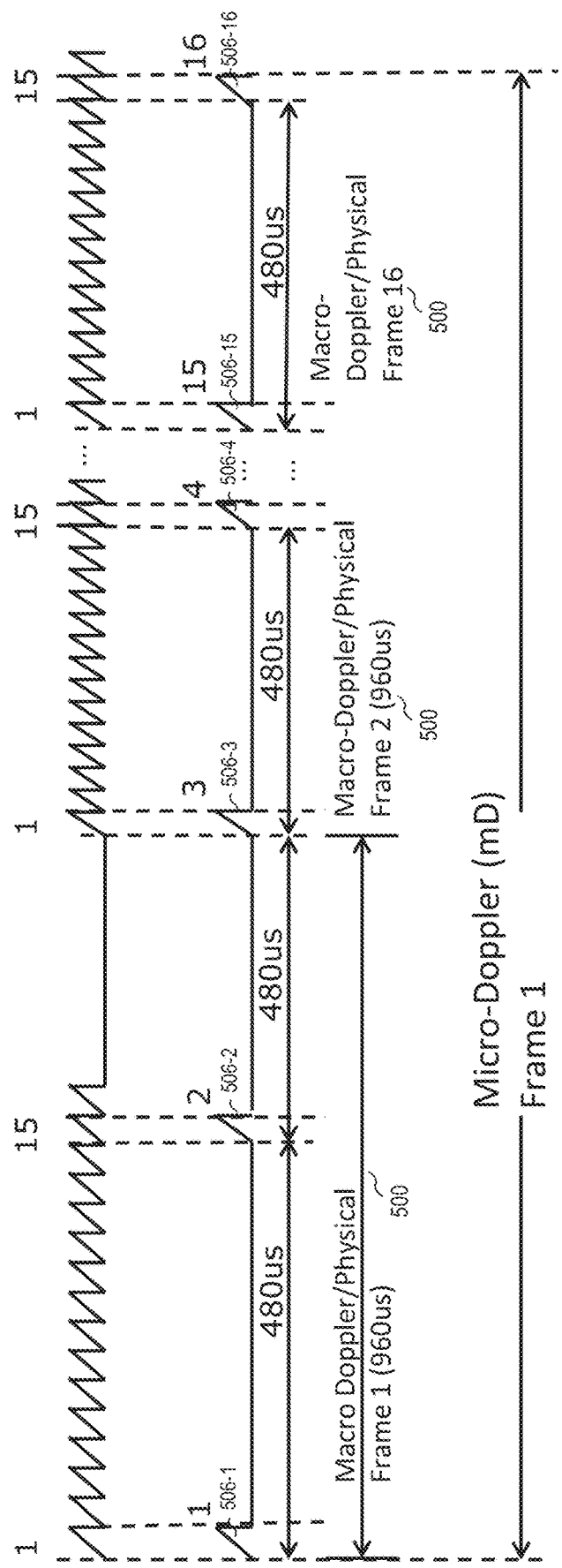
FIG. 5B shows a timing diagram illustrating the duration and constitution of a single micro-Doppler frame, in accordance with an embodiment.

FIG. 5B shows a timing diagram illustrating the duration and constitution of a single micro-Doppler frame 501, in accordance with an embodiment. The single micro-Doppler frame 501 (labelled in FIG. 5B as "Micro-Doppler Frame 1") is juxtaposed in time against the plurality of macro-Doppler frames 500 to show the relative durations and constitutions of the plurality of macro-Doppler frames 500 and the single micro-Doppler frame 501. As shown in FIG. 5B, the initial chirp 506-1 of the single micro-Doppler frame 501 is aligned in time with the initial chirp of the continuous sequence of transmitted chirps 502 of the initial macro-Doppler frame 500, while the next chirp 506-2 of the single micro-Doppler frame 501 is aligned in time with the fifteenth chirp of the continuous sequence of transmitted chirps 502 of the initial macro-Doppler frame 500. The subsequent chirp 506-3 of the single micro-Doppler frame 501 is aligned in time with the initial chirp of the continuous sequence of transmitted chirps 502 of the second macro-Doppler frame 500, and so on. The micro-Doppler frame boundary is defined as 16 consecutive micro-Doppler chirps, with each micro-Doppler chirp being 32 microseconds in duration and with consecutive micro-Doppler chirps being spaced 480 microseconds apart. Based on these time durations, the micro-Doppler processing path 304 is capable of detecting a maximum Doppler frequency of 2.083 kHz with a 130.18 Hz frequency resolution. It is noted that these time durations are merely exemplary and may be different in other embodiments.

Figure 5C:
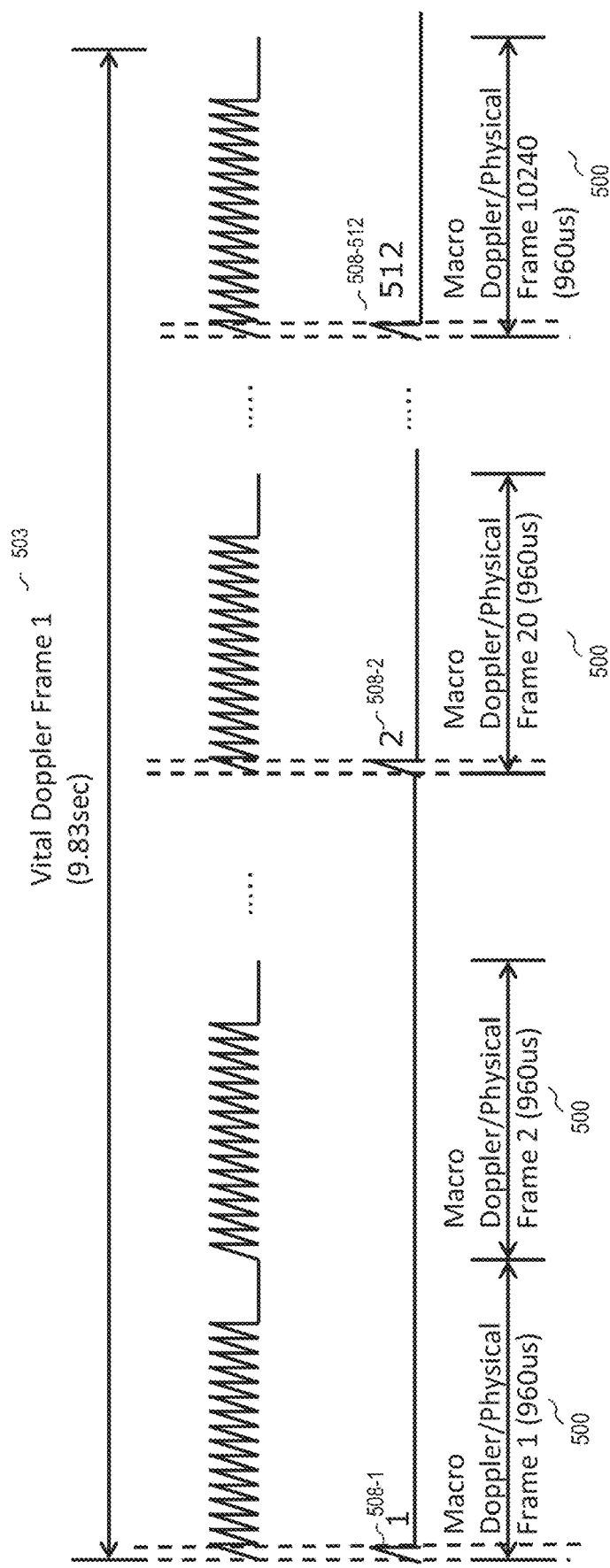
FIG. 5C shows a timing diagram illustrating the duration and constitution of a single vital-Doppler frame, in accordance with an embodiment.

FIG. 5C shows a timing diagram illustrating the duration and constitution of a single vital-Doppler frame 503, in accordance with an embodiment. The single vital-Doppler frame 503 (labelled in FIG. 5C as "Vital Doppler Frame 1") is juxtaposed in time against the plurality of macro-Doppler frames 500 to show the relative durations and constitutions of the plurality of macro-Doppler frames 500 and the single vital-Doppler frame 503. As shown in FIG. 5C, the initial chirp 508-1 of the single vital-Doppler frame 503 is aligned in time with the initial chirp of the continuous sequence of transmitted chirps 502 of the initial macro-Doppler frame 500, while the next chirp 508-2 of the single vital-Doppler frame 503 is aligned in time with the initial chirp of the continuous sequence of transmitted chirps 502 of the twentieth macro-Doppler frame 500. The subsequent chirp 508-3 of the single vital-Doppler frame 503 is aligned in time with the initial chirp of the continuous sequence of transmitted chirps 502 of the fortieth macro-Doppler frame 500, and so on. The vital-Doppler frame boundary is defined as 512 consecutive vital-Doppler chirps, with each vital-Doppler chirp being 32 microseconds in duration and with consecutive vital-Doppler chirps being spaced 19.2 milliseconds apart. Based on these time durations, the vital-Doppler processing path 306 is capable of detecting a maximum Doppler frequency of 52.083 Hz with a 0.1017 Hz frequency resolution. It is noted that these time durations are merely exemplary and may be different in other embodiments.

Figure 5D:
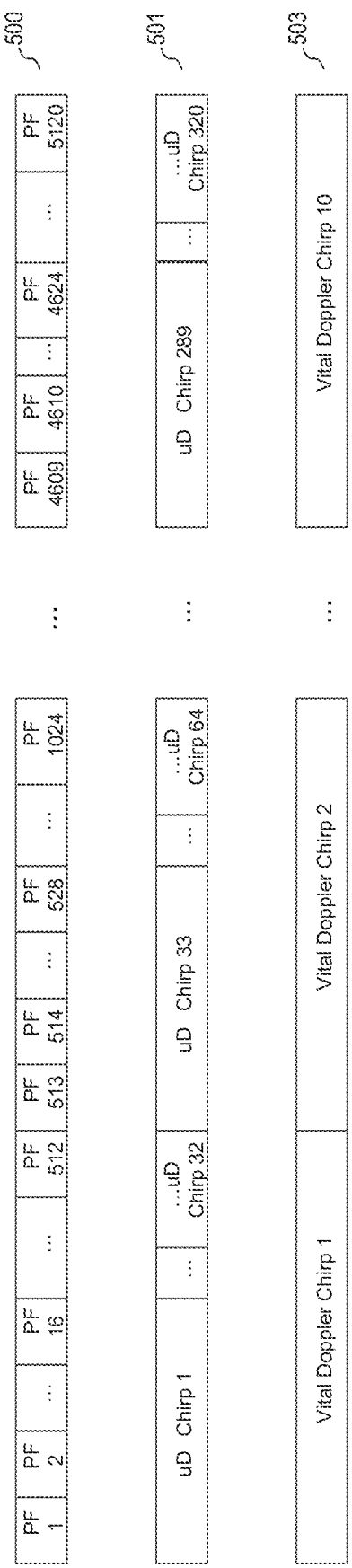
FIG. 5D summarizes the relative frame structures of macro-Doppler frames, micro-Doppler frames, and vital-Doppler frames, in accordance with an embodiment.

FIG. 5D summarizes the relative frame structures of the macro-Doppler frames 500, the micro-Doppler frames 501, and the vital-Doppler frames 503, in accordance with an embodiment. As shown in FIG. 5D, the first vital-Doppler chirp is extracted from (or aligned in time with) the first physical frame PF1 of the macro-Doppler frames 500. Similarly, the second vital-Doppler chirp is extracted from (or aligned in time with) the $513^{th}$ physical frame PF513 of the macro-Doppler frames 500, and so on. Furthermore, the first micro-Doppler chirp is extracted from (or aligned in time with) the first physical frame PF1 of the macro-Doppler frames 500. Similarly, the second micro-Doppler chirp is extracted from (or aligned in time with) the 15$^{th}$ physical frame PF15 of the macro-Doppler frames 500, while the third micro-Doppler chirp is extracted from (or aligned in time with) the 17$^{th}$ physical frame PF15 of the macro-Doppler frames 500, and so on. A single micro-Doppler frame is defined as 16 consecutive micro-Doppler chirps, a single macro-Doppler frame is defined as 16 consecutive macro-Doppler chirps from the physical frame itself, and a single vital-Doppler frame is defined as 512 consecutive vital-Doppler chirps. It is noted that these time durations are merely exemplary and may be different in other embodiments.

Figure 6:
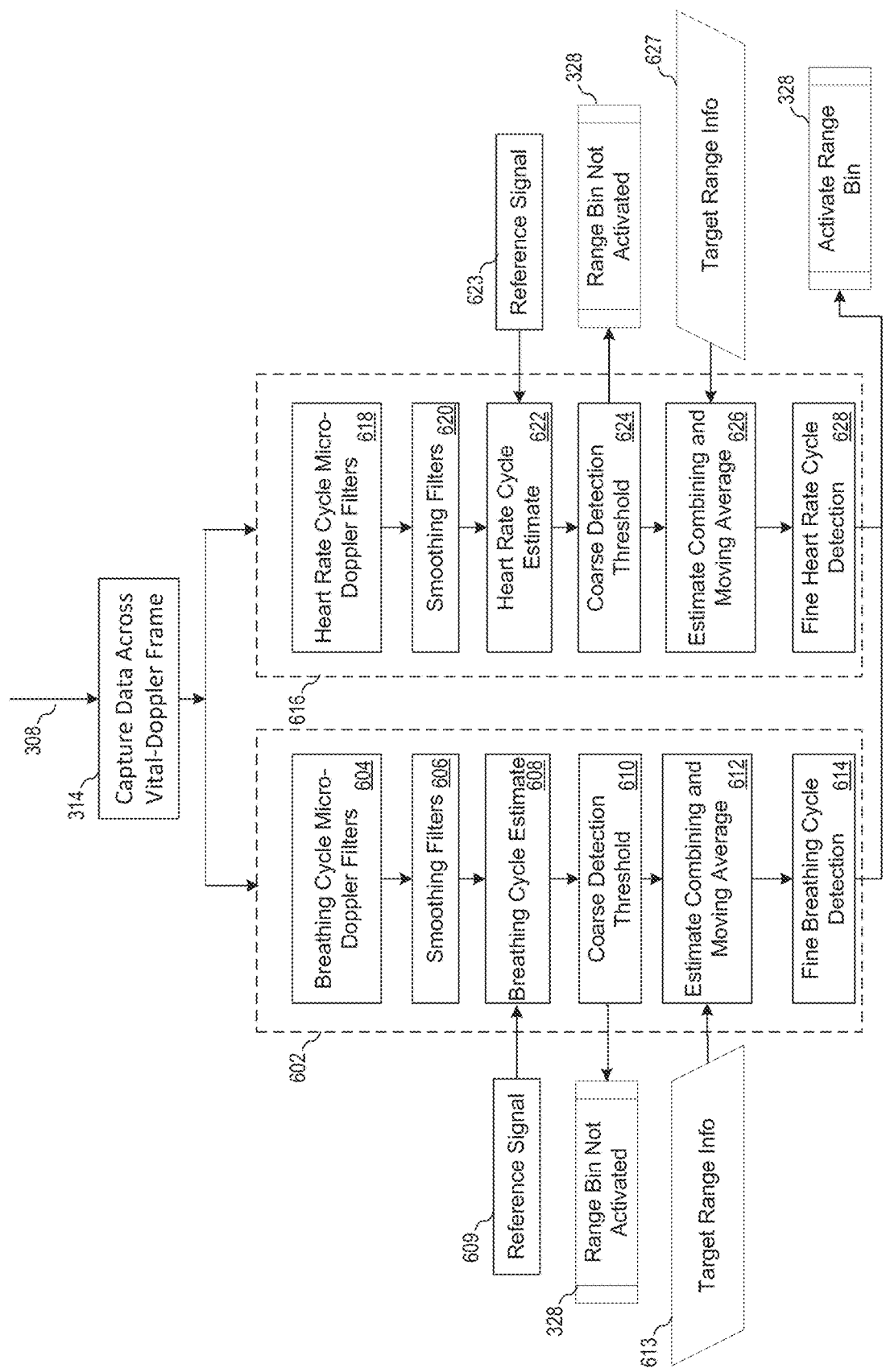
FIG. 6 illustrates an implementation of a filtering step, a signal processing and detection step, and range bin activation step along a vital-Doppler processing path of the method shown in FIG. 3, in accordance with an embodiment.

As discussed above in reference to FIG. 3, the vital-Doppler processing path 308 includes vital-Doppler filtering in step 320, signal processing and detection in step 326, and range bin activation in step 328. FIG. 6 illustrates an implementation of the filtering step 320, the signal processing and detection step 326, and range bin activation step 328 along the vital-Doppler processing path 308, in accordance with an embodiment. In the example of FIG. 6, two fixed, calibrated low bandwidth filters are employed to extract a heart-beat signal and a breathing signal from the selected range gates. Radar data associated with static inanimate targets such as chairs, TV, etc., produce no vital signals after passing through these filters, whereas radar data associated with human targets produce vital signals after passing through these embodiment filters. Thus, the output of these filters can be used to determine whether or not radar data associated with a detected target corresponds with a human being.

During the respiration vital-Doppler filtering analysis 602, motions corresponding to respiration are extracted from the data in each vital-Doppler frame in steps 604, 606, 608, 610, 612, and 614. In step 604, breathing cycle vital-Doppler filtering is performed. For example, the slow time radar signal from the specific/identified target range gate is fed into a band pass filter to determine the breathing rate. For example, a band-pass filter centered around 0.8 Hz with a bandwidth of 0.6 Hz can be used. The band-pass filter may be implemented by an infinite impulse response (IIR) or finite impulse response (FIR) filter. Alternatively, other center frequencies and bandwidths may be used.

In step 606, the output of vital-Doppler filtering step 604 is filtered using, for example, Savitzky-Golay filter to smooth the data. In step 608, the breathing cycle is estimated, for example, by performing an autocorrelation of the output of the smoothing filter step 606 to determine the periodicity of the filtered vital-Doppler results. The result of this autocorrelation is compared with reference signal 609 that represents a nominal breathing rate. In some embodiments, the reference is a reference breathing signal. Alternatively, other references may be used. The estimated breathing cycle is compared to a threshold or a plurality of thresholds in step 610. If the estimated breathing cycle is not within a predetermined range that corresponds with a normal human respiration, for example, between about 12 breaths per minute and about 35 breaths per minute, then it is determined that the target is not human and the corresponding range bin is not activated (step 328). If the determined respiration is within the predetermined range, then the resulting estimate is averaged along with recent past measurements in step 612 using target ranged information 613 and a moving average algorithm known in the art.

From the range information, all the corresponding range bins are fed into the breathing rate filter to analyze if they possess breathing rate signals. In various embodiments, the moving average represents between about one second and two seconds of filtered respiration measurements. Alternatively, the moving average may be performed over other time periods. Based on the result of the moving average produced by step 612, a fine breathing rate cycle is performed in step 614. In the fine breathing rate estimation cycle, more slow-time data is accumulated to get a finer estimate of the breathing rate. Alternatively, the breathing rate may be determined using an FFT method. For example, an FFT after windowing (Hanning or Kaiser window) is performed on the slow-time filtered breathing data. The coarse detection phase applies a threshold if there is a substantial breathing frequency component and the fine detection phase picks the maximum frequency component as the estimated breathing rate. The fine detection estimation phase may be skipped if the coarse threshold detection does not have a breathing frequency component that crosses the desired threshold. In some embodiments, the desired threshold is set to be at least ten times the noise floor.

During the heart rate vital-Doppler filtering analysis 616, motions corresponding to heart rate are extracted from the data in each vital-Doppler frame radar data in steps 618, 620, 622, 624, 626 and 628 in a similar manner as breathing cycle vital-Doppler filtering analysis 602. In step 618, heart rate vital-Doppler filtering is performed. For example, the slow time radar signal from the specific/identified target range gate is fed into a band pass filter to determine the heart rate. For example, a band-pass filter centered around 2 Hz with a bandwidth of 3 Hz can be used. The band-pass filter may be implemented by an infinite impulse response (IIR) or finite impulse response (FIR) filter. Alternatively, other center frequencies and bandwidths may be used.

In step 620, the output of vital-Doppler filtering step 618 is filtered using, for example, a low-pass filter to smooth the data. In step 622, the an estimate of the heart rate is estimated, for example, by performing an autocorrelation of the output of the smoothing filter in step 620 to determine the periodicity of the filtered vital-Doppler results. The result of this autocorrelation is compared with reference signal 623 that represents a heart rate. In some embodiments, the reference is a standard FDA approved breathing signal of 60 beats/min. The estimated heart rate is compared with a threshold or a plurality of thresholds in step 624. If the estimated breathing cycle is not within a predetermined range that corresponds with a normal heart rate, for example, between about 50 beats per minute and about 200 beats per minute, then it is determined that the target is not human and the corresponding range bin is not activated (step 328). If the determined heart rate is within the predetermined range, then the resulting estimate is averaged along with recent past measurements in step 626 using target ranged information 627 and a moving average algorithm known in the art.

From the range information all the corresponding range bins are fed into the heart rate filter to analyze if they possess heart rate signals. In various embodiments, the moving average represents between about one second and two seconds of filtered heart rate measurements. Alternatively, the moving average may be performed over other time periods. Based on the result of the moving average produced by step 626, a fine heart rate detection is performed in step 628. In the heart rate estimation cycle, more slow-time data is accumulated to get a finer estimate of the heart rate. Alternatively, the heart rate may be determined using an FFT method. For example, an FFT after windowing (Hanning or Kaiser window) is performed on the slow-time filtered heart rate data. The coarse detection phase applies a threshold if there is a substantial heart rate frequency component and the fine detection phase picks the maximum frequency component as the estimated heart rate. The fine detection estimation phase may be skipped if the coarse threshold detection does not have a heart rate frequency component that crosses the desired threshold. In some embodiments, the desired threshold is set to be at least ten times the noise floor.

If both breathing cycle vital-Doppler filtering analysis 602 and heart rate vital-Doppler filtering analysis 616 determine that the respective estimated breathing cycle and heart rate measurements are within a predetermined ranged, the corresponding range bin is activated in step 328. Alternatively, the corresponding range bin is activated if at least one of the breathing cycle and the heart rate is determined to be within a range of a human being.

Figure 7A:
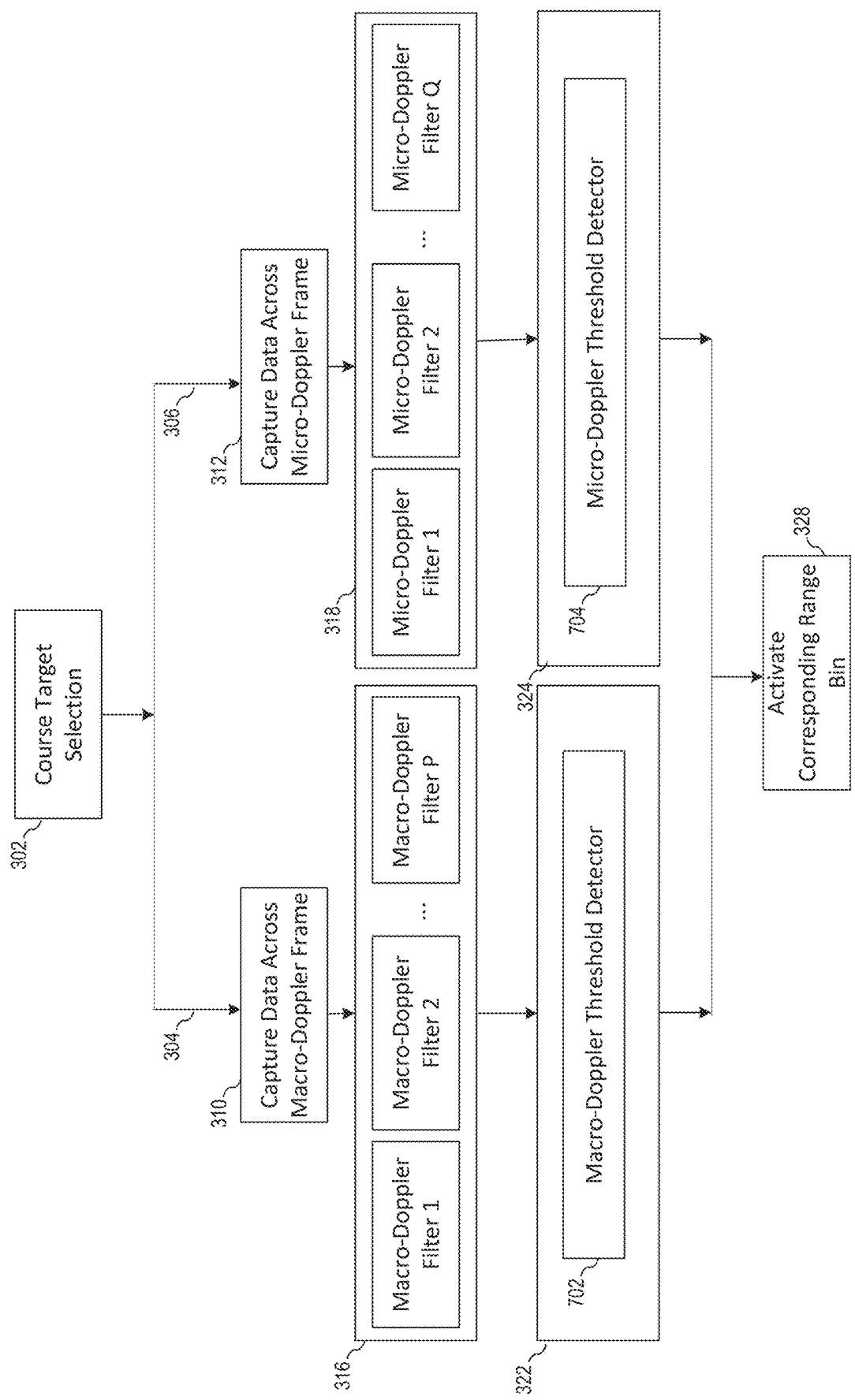
FIGS. 7A-7B illustrate implementations of filtering steps, signal processing and detection steps, and range bin activation steps along macro-Doppler and micro-Doppler processing paths of the method shown in FIG. 3, in accordance with various embodiments.

As discussed above in reference to FIG. 3, the macro-Doppler processing path 304 includes macro-Doppler filtering in step 316, signal processing and detection in step 322, and range bin activation in step 328. Similarly, the micro-Doppler processing path 306 includes micro-Doppler filtering in step 318, signal processing and detection in step 324, and range bin activation in step 328. FIG. 7A illustrates an implementation of the filtering steps 316 and 318, the signal processing and detection steps 322 and 324, and range bin activation step 328 along the macro-Doppler and micro-Doppler processing paths 304 and 306, in accordance with an embodiment where a bank of filters is used (e.g. instead of an FFT approach). As shown in FIG. 7A, the macro-Doppler filtering step 316 may be implemented using a macro-Doppler filter bank including an array of P band-pass filters that separates the data across each macro-Doppler frame into multiple components, where each component carries a single frequency sub-band of the original signal fed into the filter bank. In like manner, the micro-Doppler filtering step 318 may be implemented using a micro-Doppler filter bank including an array of Q band-pass filters that separates the data across each micro-Doppler frame into multiple components, where each component carries a single frequency sub-band of the original signal fed into the filter bank. In general, P and Q may be integers in the range of 8 and 64. As an example, P may be equal to 16 and Q may be equal to 32.

The macro-Doppler signal processing and detection step 322 may be implemented using a macro-Doppler threshold detector 702. In an embodiment, the macro-Doppler threshold detector 702 determines the energy of the output signal of each of the P band-pass filters of the macro-Doppler filter bank using methods known in the art. The energy of the respective output signal of each of the P band-pass filters is then compared against its corresponding threshold $\eta_1$, which may be at least ten times the noise floor of the corresponding band-pass filter of the macro-Doppler filter bank. If the energy of the output signal of a particular band-pass filter is greater than or equal to its corresponding threshold $\eta_1$, the corresponding range bin is activated (in step 328), indicating that a valid human target has been detected. This series of steps may be expressed mathematically as:

$$\sum_{i=1}^{N_{macro}} x_k(i)x_k(i)^H \geq \eta_{1,k} \quad \forall k \in \{1, P\}$$

where $N_{macro}$ is the number of samples of the output signal of each of the P band-pass filters of the macro-Doppler filter bank.

In another embodiment, the macro-Doppler threshold detector 702 determines the collective energy (e.g. total energy) of all the output signals of the P band-pass filters of the macro-Doppler filter bank using methods known in the art. The collective energy of the output signals of the macro-Doppler filter bank is then compared against a threshold $\sigma_1$, which may be at least ten times the sum of the noise floors of the band-pass filters of the macro-Doppler filter bank. If the collective energy of the output signals of the P band-pass filters is greater than or equal to the threshold $\sigma_1$, the corresponding range bin is activated (in step 328), indicating that a valid human target has been detected. This series of steps may be expressed mathematically as:

$$\sum_{k=1}^{P} \sum_{i=1}^{N_{macro}} x_k(i)x_k(i)^H \geq \sigma_1$$

where $N_{macro}$ is the number of samples of the output signal of each of the P band-pass filters of the macro-Doppler filter bank and where the threshold $\sigma_1$ may be expressed as:

$$\sigma_1 = \sum_{k=1}^{P} \eta_{1,k}$$

The micro-Doppler signal processing and detection step 324 may be implemented using a macro-Doppler threshold detector 704. In an embodiment, the micro-Doppler threshold detector 704 determines the energy of the output signal of each of the Q band-pass filters of the micro-Doppler filter bank using methods known in the art. The energy of the respective output signal of each of the Q band-pass filters is then compared against its corresponding threshold $\eta_2$, which may be at least ten times the noise floor of the corresponding band-pass filter of the micro-Doppler filter bank. If the energy of the output signal of a particular band-pass filter is greater than or equal to its corresponding threshold $\eta_2$, the corresponding range bin is activated (in step 328), indicating that a valid human target has been detected. This series of steps may be expressed mathematically as:

$$\sum_{i=1}^{N_{micro}} x_k(i)x_k(i)^H \geq \eta_{2,k} \quad \forall k \in \{1, Q\}$$

where $N_{micro}$ is the number of samples of the output signal of each of the Q band-pass filters of the micro-Doppler filter bank.

In another embodiment, the micro-Doppler threshold detector 704 determines the collective energy (e.g. total energy) of all the output signals of the Q band-pass filters of the micro-Doppler filter bank using methods known in the art. The collective energy of the output signals of the micro-Doppler filter bank is then compared against a threshold $\sigma_2$, which may be at least ten times the sum of the noise floors of the band-pass filters of the micro-Doppler filter bank. If the collective energy of the output signals of the Q band-pass filters is greater than or equal to the threshold $\sigma_2$, the corresponding range bin is activated (in step 328), indicating that a valid human target has been detected. This series of steps may be expressed mathematically as:

$$\sum_{k=1}^{Q}\sum_{i=1}^{N_{micro}} x_k(i)x_k(i)^H \geq \sigma_2$$

where $N_{micro}$ is the number of samples of the output signal of each of the Q band-pass filters of the micro-Doppler filter bank and where the threshold $\sigma_2$ may be expressed as:

$$\sigma_2 = \sum_{k=1}^{Q} \eta_{2,k}$$

Figure 7B:
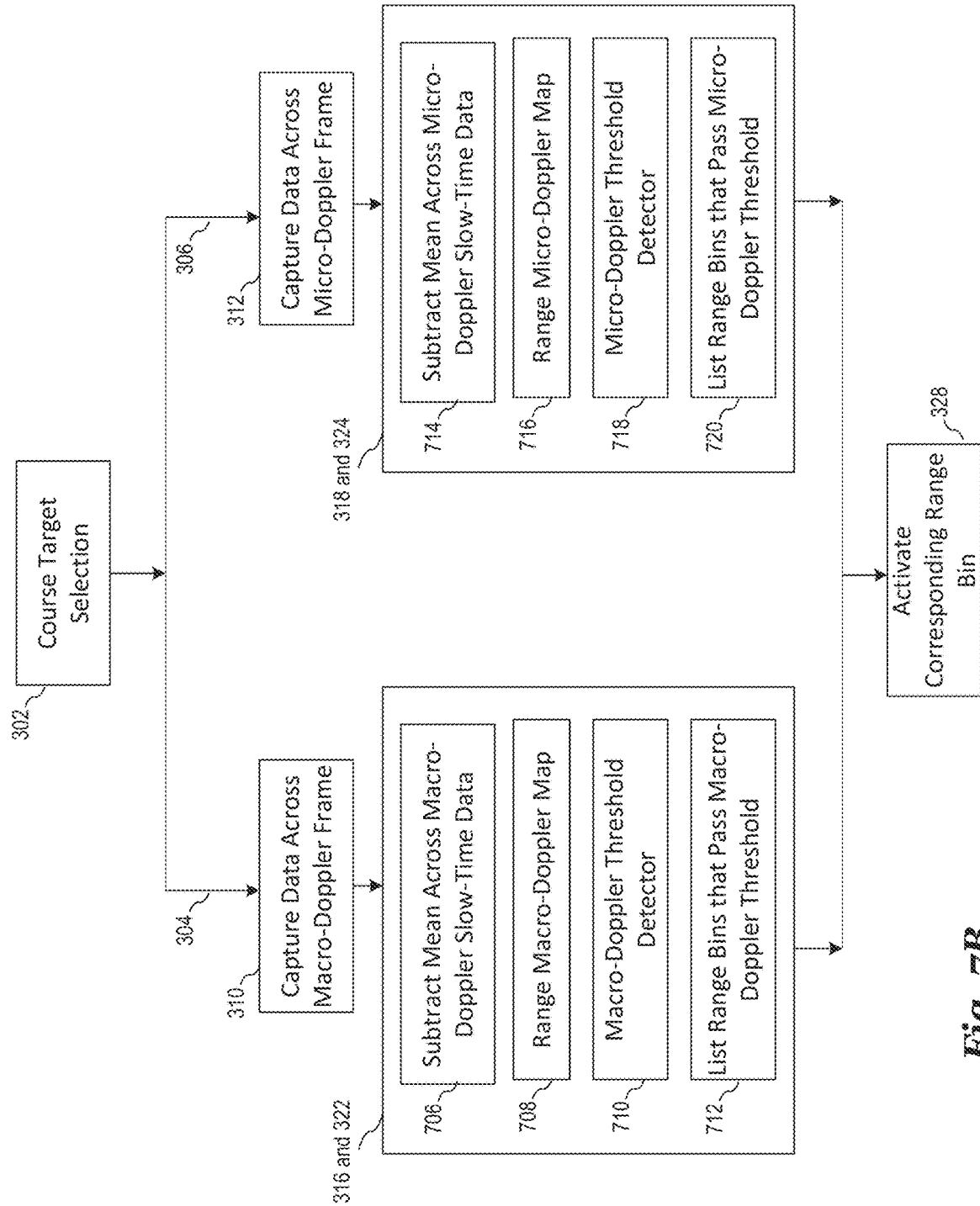

FIG. 7B illustrates an implementation of the filtering steps 316 and 318, the signal processing and detection steps 322 and 324, and range bin activation step 328 along the macro-Doppler and micro-Doppler processing paths 304 and 306, in accordance with another embodiment where an FFT approach is used (e.g. instead of a bank of filters). In the filtering and signal processing and detection steps 316 and 322 of the macro-Doppler processing path 304, the mean of the macro-Doppler slow-time data is determined according to methods known in the art and subsequently subtracted from the macro-Doppler slow-time data (in step 706). Subtraction of the mean from the macro-Doppler slow-time data eliminates signals of static targets in data of each macro-Doppler frame. A range-Doppler map of the macro-Doppler data from step 706 is then generated in step 708 according to methods known in the art (e.g. by taking an FFT across slow-time). It is noted that in comparison to the bank of filters approach (which is a time-domain approach and which does not require mean subtraction), the processing depicted in steps 706 and 708 is a frequency-domain approach, requires mean subtraction, and is less computationally expensive compared to the bank of filters approach. In step 710, the range-Doppler map is convolved with a first reference point spread function. In some embodiments, the first reference point spread function may be a two-dimensional Gaussian filter. The magnitude of the result of the convolution is then compared against a macro-Doppler threshold (e.g. as in step 702 of FIG. 7A) and range bins that are at least equal to the macro-Doppler threshold are determined (in step 712) and these range bins are subsequently activated (in step 328). In general, the convolution in step 710 may be expressed as $z(u,v)=\Sigma_{m=1}^{M}\Sigma_{n=1}^{N}x(m+u,n+v)*p(m,n)$, where $p(m,n)$ is the first reference point spread function, $x(m,n)$ is the range-Doppler map from step 708, and M and N are the number of range bins and the number of Doppler frequency ranges, respectively. The comparison of the magnitude of the result of the convolution to the macro-Doppler threshold may be expressed as $|z(u,v)|>\eta 1$.

In the filtering and signal processing and detection steps 318 and 324 of the micro-Doppler processing path 306, the mean of the micro-Doppler slow-time data is determined according to methods known in the art and subsequently subtracted from the micro-Doppler slow-time data (in step 714). Subtraction of the mean from the micro-Doppler slow-time data eliminates signals of static targets in data of each micro-Doppler frame. A range-Doppler map of the micro-Doppler data from step 714 is then generated in step 716 according to methods known in the art (e.g. by taking an FFT across slow-time). It is noted that in comparison to the bank of filters approach (which is a time-domain approach and which does not require mean subtraction), the processing depicted in steps 714 and 716 is a frequency-domain approach, requires mean subtraction, and is less computationally expensive compared to the bank of filters approach. In step 718, the range-Doppler map is convolved with a second reference point spread function. In some embodiments, the second reference point spread function may be a two-dimensional Gaussian filter and/or may be identical to the first reference point spread function used in step 710. The magnitude of the result of the convolution is then compared against a micro-Doppler threshold (e.g. as in step 704 of FIG. 7A) and range bins that are at least equal to the micro-Doppler threshold are determined (in step 720) and these range bins are subsequently activated (in step 328). In general, the convolution in step 718 may be expressed as $y(u,v)=\Sigma_{m=1}^{M}\Sigma_{n=1}^{N}w(m+u,n+v)*q(m,n)$, where $q(m,n)$ is the second reference point spread function, $w(m,n)$ is the range-Doppler map from step 716, and M and N are the number of range bins and the number of Doppler frequency ranges, respectively. The comparison of the magnitude of the result of the convolution to the micro-Doppler threshold may be expressed as $|y(u,v)|>\eta 2$.

Referring back to FIG. 3, the different processing paths 304, 306, 308 update the active range bins either independently at the end of their respective frames or collectively at the end of a vital-Doppler frame. If the processing paths 304, 306, 308 update the active range bins at the end of their respective frame boundaries, a lifecycle count assigned for each processing path 304, 306, 308 is different. For example, the lifecycle count of a range bin activated by the macro-Doppler processing path 304 is greater than the lifecycle count a range bin activated by the micro-Doppler processing path 306. As an example, the lifecycle count of a range bin activated by the macro-Doppler processing path 304 may be about 10,000, while the lifecycle count of a range bin activated by the micro-Doppler processing path 306 may be about 500. Furthermore, the lifecycle count of a range bin activated by the micro-Doppler processing path 306 is greater than the lifecycle count a range bin activated by the vital-Doppler processing path 308. The lifecycle count of a range bin activated by the vital-Doppler processing path 308 may be about 10. Assigning a different lifecycle count for each processing path 304, 306, 308 ensures that stale data expires at about the same time irrespective of their update frame or cycle. On the other hand, if the different processing paths 304, 306, 308 update the active range bin collectively together at the end of the common vital Doppler frame, then the same lifecycle count is assigned to the active range bin irrespective of which processing path the update originates from.

In some embodiments, the lifecycle count of each active range bin is decremented every frame update. Once the lifecycle count reaches zero, the corresponding range bin is removed from the active list. It is noted that whenever a processing path updates a range bin which is already in the active list, the corresponding life-cycle count is reset to a default value. The people count is done at the end of a vital Doppler frame by executing a range clustering operation (in step 330) along range bins followed by counting the number of clustered range bins. At the end of their independent frames, the macro-Doppler processing path 304, the micro-Doppler processing path 306, and vital-Doppler processing path 308 separately update the range bins where target humans are detected as active range bins along with the life-cycle count. Thus, the system stores the tuple including the active range bin number and its corresponding life-cycle count, which may be used in a range retention scheme in step 334. It is noted that the range clustering operation in step 330 is performed after activation of corresponding range bins and, if applicable, range retention, and is performed to prevent a single object being counted as multiple objects. In embodiments where azimuth information is also used, the system stores the tuple including the active range bin number, the angle, and its corresponding life-cycle count, which may also be used in the range retention scheme in step 334.

Figure 8:
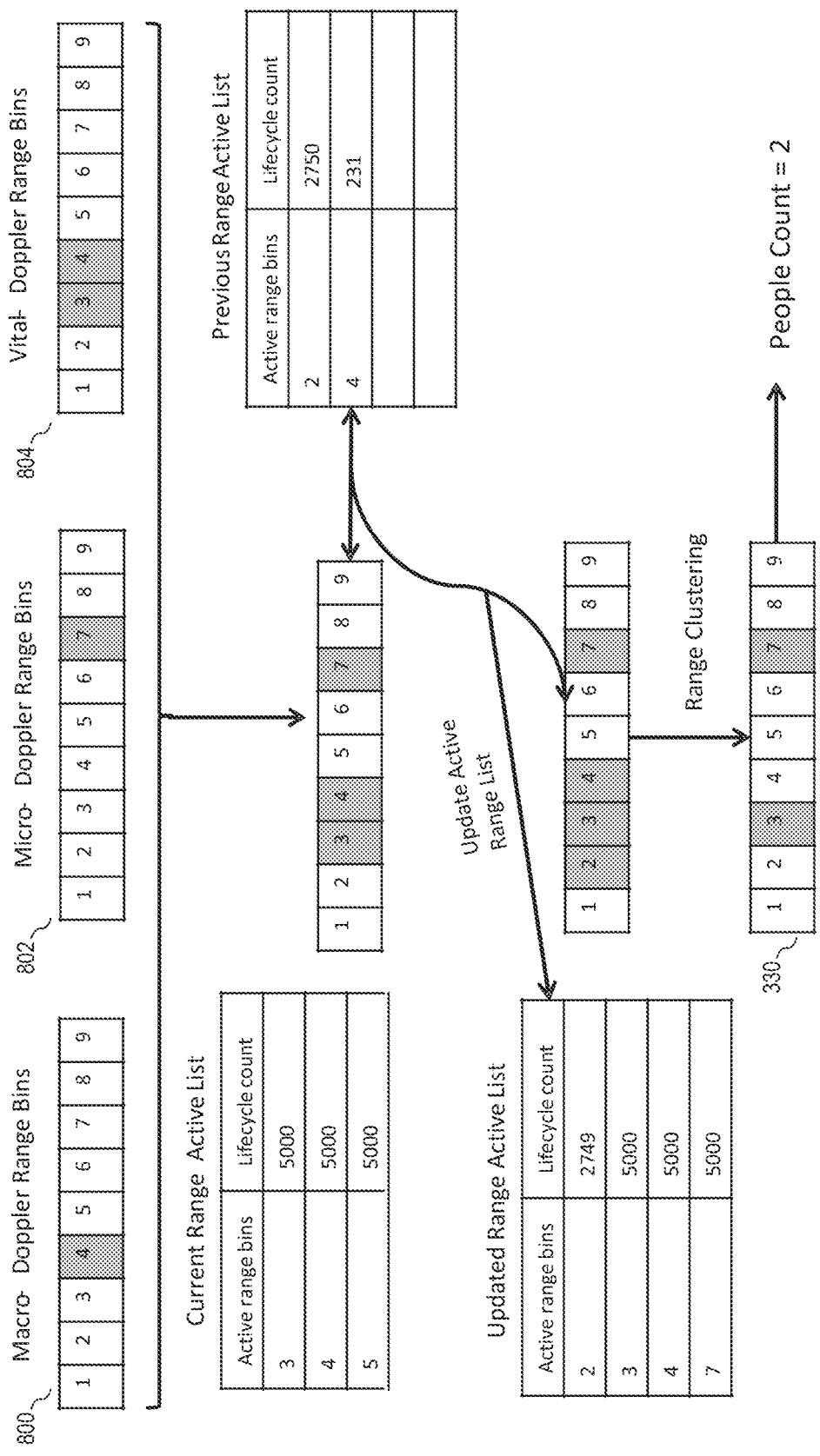
FIG. 8 illustrates a range retention scheme, in accordance with an embodiment.

In the range retention scheme, the active range bin number from the most recent tuple is combined with the active range bin number of the current tuple and the life-cycle count of the current tuple is updated. In embodiments where azimuth information is also used, the range retention scheme combines the active range bin number from the most recent tuple with the active range bin number of the current tuple and also combines the angle from the most recent tuple with the angle of the current tuple, further updating the life-cycle count of the current tuple. An embodiment range retention scheme is illustrated in FIG. 8. As shown in FIG. 8, the macro-Doppler processing path 304 includes range bins 800 in which bin 4 is activated (e.g. based on the above-described processing and detection steps). The micro-Doppler processing path 306 includes range bins 802 in which bin 7 is activated and the vital-Doppler processing path 308 includes range bins 804 in which bins 3 and 4 are activated. The range bins 800, 802, and 804 are combined to yield a current range active list where bins 3, 4, and 7 are indicated as being active and where each is assigned a default lifecycle count (e.g. 5000 in the example of FIG. 8). In the example of FIG. 8, the most recent tuple indicates bins 2 and 4 as being active, with the lifecycle count of bin 4 being 2750 and the lifecycle count of bin 4 being 231. In the range retention scheme, the active range bin number from the most recent tuple is combined with the active range bin number of the current tuple and the life-cycle count of the current tuple is updated. As such, since bin 2 is not in the current range active list, the range active list is updated with bin 2, and the lifecycle count of bin 2 is subsequently decremented by 1. On the other hand, since bin 4 is already in the current range active list, the lifecycle count of bin 4 in the updated range active list is left undisturbed. The range clustering operation is performed in step 330 to yield a result where only bins 3 and 7 are indicated as being active. The people count is then set as being the number of active range clusters of the range clustering step 330, i.e., the people count is determined to be 2.

In the method 300 illustrated in FIG. 3, it is noted that the people count is not directly increased on detection of a macro-Doppler movement, a micro-Doppler movement, or a vital-Doppler movement. Rather, corresponding range bins are activated with a lifecycle count (e.g. 5000) and this lifecycle count is decremented at every frame when no signal above the corresponding Doppler threshold is detected. Apart from range bins being activated by the macro-Doppler processing path 304 and the micro-Doppler processing path 306, the range bins are also activated by the vital-Doppler processing path 308. Based on the range retention scheme, it may be possible that no macro-Doppler or micro-Doppler signals are present to activate a range bin in a current range active list, even though macro-Doppler or micro-Doppler signals were present in the most recent range active list. This scenario may be attributed to the target human becoming stationary. In such a case, the people count is retained and not decremented until the lifecycle count expires (i.e., reaches zero). Since the human is present in the area 110, the vital-Doppler processing path 308 can activate the range bin before the active lifecycle expires and hence no false calculation of people in area 110 occurs. The above-identified scenario may also be attributed to the target human walking out of the area. In such a case, the active range bin expires after the lifecycle count reaches zero. Since the target human is not in the area 110, the vital-Doppler processing path 308 does not activate any range bin, and thus the active range bin is allowed to expire, after which the people count is decremented. It is noted again that clustering is performed after creation of the active range list.

Figures 9A, 9B:
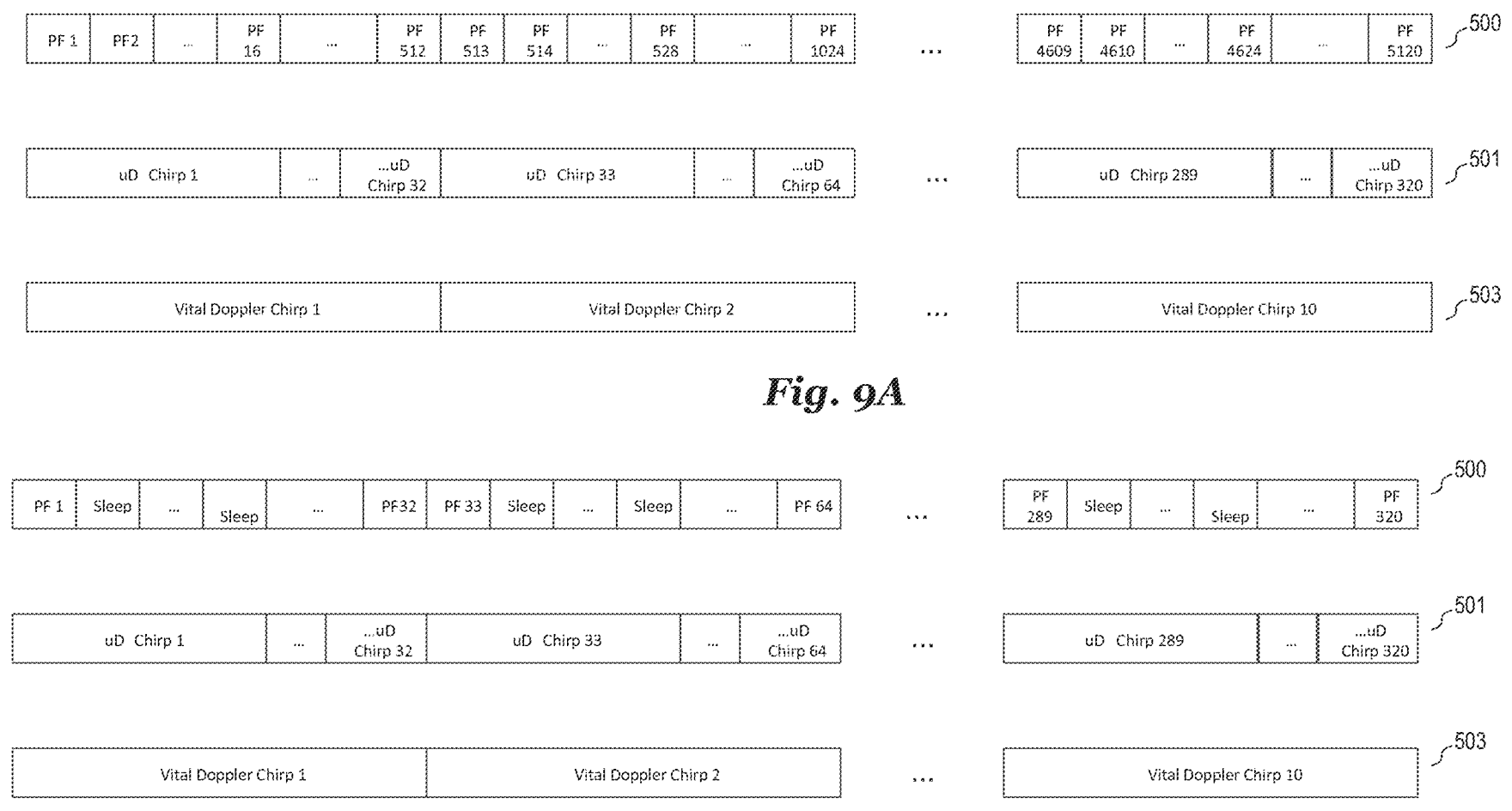

The separation of processing into macro-Doppler processing path into separate frame boundaries also facilitates the system 100 to perform adaptive power control. FIG. 9A shows the relative frame structures of the macro-Doppler frames 500, the micro-Doppler frames 501, and the vital-Doppler frames 503 when the macro-Doppler processing path 304 activates a range bin. When the macro-Doppler processing path 304 activates a range bin, both the macro-Doppler and micro-Doppler frames are active. The physical sensor frame is aligned to the macro-Doppler frame boundary. The macro-Doppler processing path 304, the micro-Doppler processing path 306, and vital-Doppler processing path 308 are active and signals therefrom are analyzed to detect human activity and classify the behavior associated with the human activity (e.g. by using a machine learning algorithm such as, but not limited to a random forest algorithm, adaptive boosting (AdaBoost) algorithm and/or a neural network algorithm). In such a scenario, all filters of the macro-Doppler processing path 304, the micro-Doppler processing path 306, and vital-Doppler processing path 308 are enabled. Furthermore, the range retention scheme discussed above in reference to FIG. 8 is activated to stitch human behavior across time and thus, the millimeter-wave radar sensor 102 is running at full power.

FIG. 9B shows the relative frame structures of the macro-Doppler frames 500, the micro-Doppler frames 501, and the vital-Doppler frames 503 when the macro-Doppler processing path 304 does not activate a range bin but the micro-Doppler processing path 306 activates a range bin. When macro-Doppler activity is absent, but micro-Doppler activity is present, the physical sensor frame is aligned to the micro-Doppler frame boundary. In such a scenario, only the filters of the micro-Doppler processing path 306 and vital-Doppler processing path 308 are enabled. The micro-Doppler processing path 306 and vital-Doppler processing path 308 are active and signals therefrom are analyzed to detect human activity and classify the behavior associated with the human activity (e.g. by using a machine learning algorithm such as, but not limited to a random forest algorithm, adaptive boosting (AdaBoost) algorithm and/or a neural network algorithm). Furthermore, the vital signs that are detected are recorded or stored. Furthermore, the range retention scheme discussed above in reference to FIG. 8 is activated to stitch human behavior (e.g. inactivity) across time and thus, the millimeter-wave radar sensor 102 is running at lower power compared to the scenario associated with FIG. 9A. It is noted that when the macro-Doppler processing path 304 does not activate a range bin but the micro-Doppler processing path 306 activates a range bin, once the micro-Doppler's maximum detected frequency is more than 80% of its upper limit, the physical frame is switch the macro-Doppler mode such as in the scenario associated with FIG. 9A.

Figures 9C, 9D:
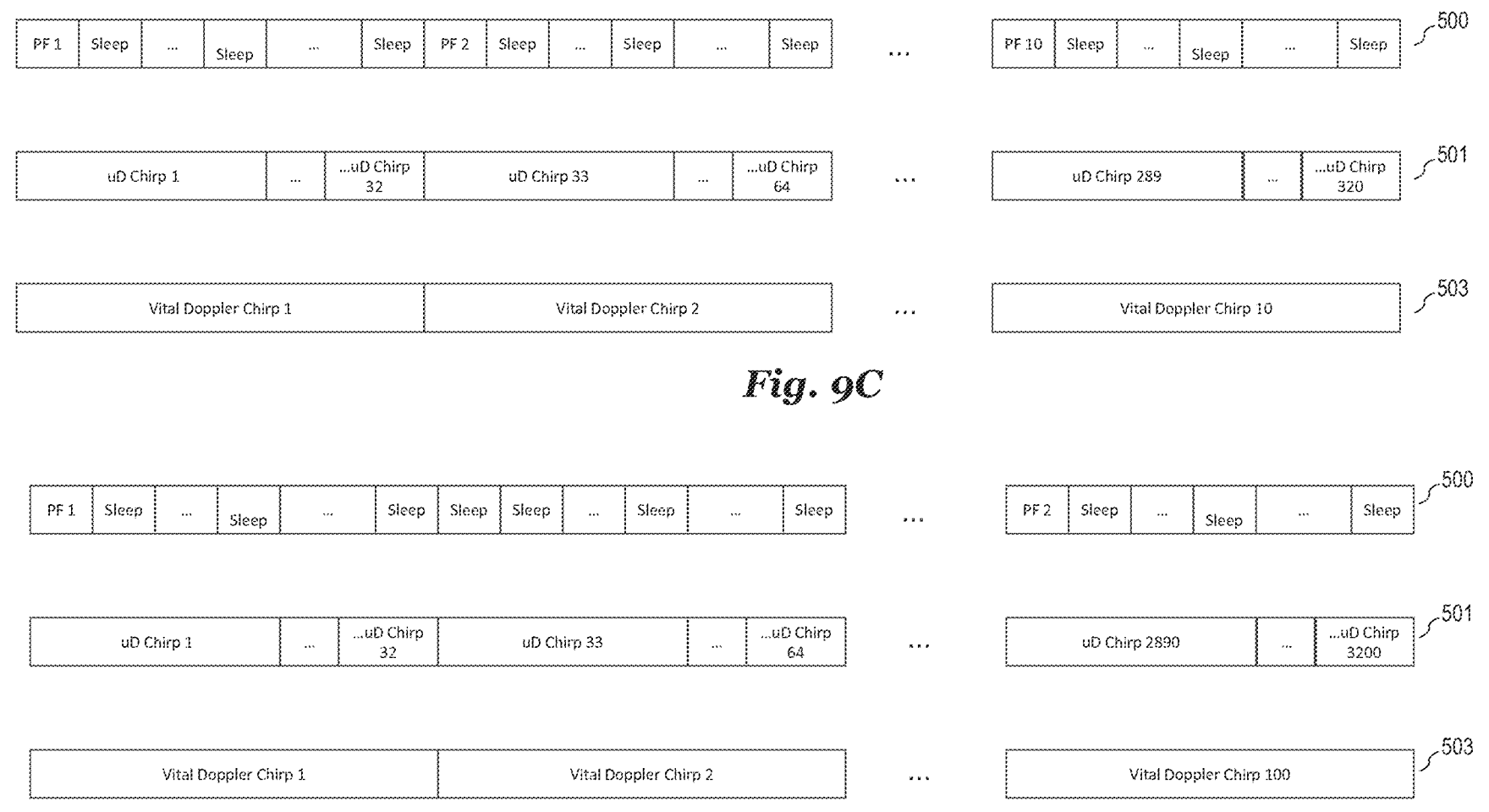

FIG. 9C shows the relative frame structures of the macro-Doppler frames 500, the micro-Doppler frames 501, and the vital-Doppler frames 503 when the macro-Doppler processing path 304 and the micro-Doppler processing path 306 do not activate a range bin but the vital-Doppler processing path 308 activates a range bin. When macro-Doppler activity and micro-Doppler activity are absent, but vital-Doppler activity is present, the physical sensor frame is aligned to the vital-Doppler frame boundary. In such a scenario, only the filters of the vital-Doppler processing path 308 are enabled. The vital-Doppler processing path 308 is active and signals therefrom are analyzed to detect human activity and classify the behavior associated with the human activity (e.g. by using a machine learning algorithm such as, but not limited to a random forest algorithm, adaptive boosting (AdaBoost) algorithm and/or a neural network algorithm). Furthermore, the vital signs that are detected are recorded or stored. Furthermore, the range retention scheme discussed above in reference to FIG. 8 is activated to stitch human behavior (e.g. inactivity) across time and thus, the millimeter-wave radar sensor 102 is running at lower power compared to the scenario associated with FIG. 9B. It is noted that in some embodiments, a micro-Doppler frame is run between every 15 and 30 vital-Doppler frames to probe activity in the area 110. If activity is observed through the micro-Doppler processing path 306, a high power mode (e.g. associated with FIG. 9A or 9B) is activated.

FIG. 9D shows the relative frame structures of the macro-Doppler frames 500, the micro-Doppler frames 501, and the vital-Doppler frames 503 when the macro-Doppler processing path 304, the micro-Doppler processing path 306, and the vital-Doppler processing path 308 do not activate a range bin. When macro-Doppler activity, micro-Doppler activity, and vital-Doppler activity are absent, no physical sensor frame is present. In such a scenario, none of the filters of the macro-Doppler processing path 304, the micro-Doppler processing path 306, or the vital-Doppler processing path 308 are enabled. In this scenario, the millimeter-wave radar sensor 102 is in a deep sleep mode, which has the lowest power consumption compared to the scenarios associated with FIGS. 9A-9C. The deep sleep mode may be indicative that no human being is present in area 110. However, it is noted that in some embodiments, a macro-Doppler frame is run between every 80 and 120 vital-Doppler frames to probe activity in the area 110. If activity is observed through the macro-Doppler processing path 304, a high power mode (e.g. associated with FIG. 9A) is activated.

Figure 10:
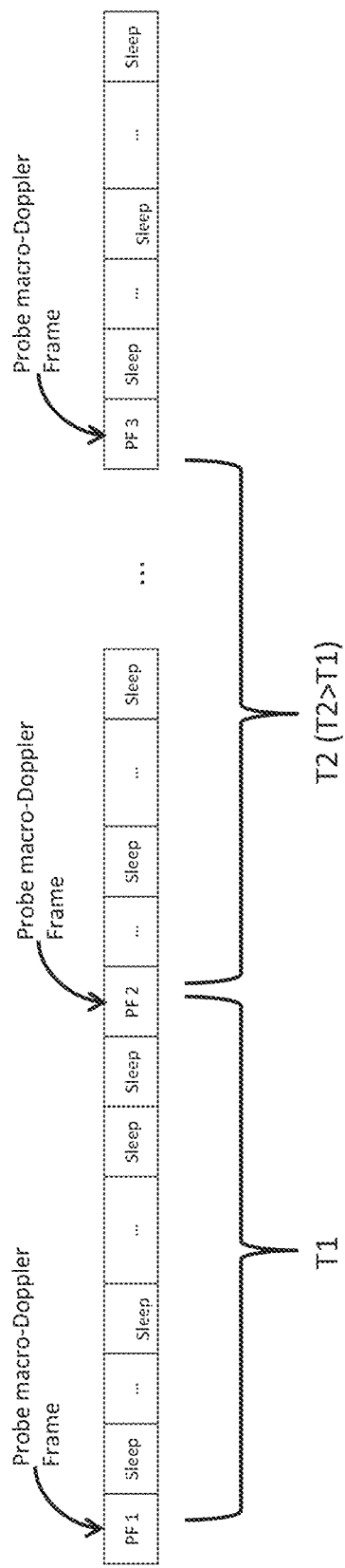
FIG. 10 illustrates progressively increasing sleep times that are executed to determine if wake-up from a low-power mode is necessary, in accordance with an embodiment.

As discussed above in reference to FIG. 9D, a macro-Doppler frame may be run between every 80 and 120 vital-Doppler frames to probe activity in the area 110. In other embodiments, however, the macro-Doppler frame may be run at progressively increasing sleep times to determine if wake-up is necessary. FIG. 10 illustrates an embodiment where progressively increasing sleep times are executed to determine if wake-up is necessary. As shown in FIG. 10, the time duration T1 between the first macro-Doppler probe frame PF1 and the second macro-Doppler probe frame PF1 is less than the time duration T2 between the second macro-Doppler probe frame PF2 and the third macro-Doppler probe frame PF3. In some embodiments, T1 may be between about 40 seconds and 60 seconds (e.g. about 50 seconds), while T2 may be between 3 minutes and 6 minutes (e.g. about 5 minutes). Similarly, the time duration T2 between the second macro-Doppler probe frame PF2 and the third macro-Doppler probe frame PF3 is less than the time duration T3 (not shown in FIG. 10) between the third macro-Doppler probe frame PF3 and the fourth macro-Doppler probe frame PF4 (not shown in FIG. 10). The time duration between consecutive macro-Doppler probe frames may be increased until a maximum threshold (e.g. about 15 minutes).

Summarizing FIGS. 9A-9D and FIG. 10, once a macro-Doppler active range bin expires, but a micro-Doppler range bin is still active, then the power mode described in FIG. 9B is enabled in order to save power by making the physical sensor's frame boundary to be that of the micro-Doppler frame. Similarly, if no macro-Doppler active range bins and no micro-Doppler active range bins are present, but a vital-Doppler range bin is present, then the power mode described in FIG. 9C is enabled in order to to save power by making the physical sensor's frame boundary to be that of the vital-Doppler frame. Furthermore, if no macro-Doppler active range bins, no micro-Doppler active range bins, and no vital-Doppler range bins are present, the system 100 progressively goes into the deep sleep mode described in FIG. 9D, with periodic probing macro-Doppler frame in some embodiments. In the power modes described in FIGS. 9B and 9C, periodic macro-Doppler probing is performed (e.g. every 30 seconds to 1 minute) to check if there is any macro-Doppler movement. If such macro-Doppler movement is detected, the sensor 100 switches to full power mode (e.g. as in the scenario of FIG. 9A).

Figure 11:
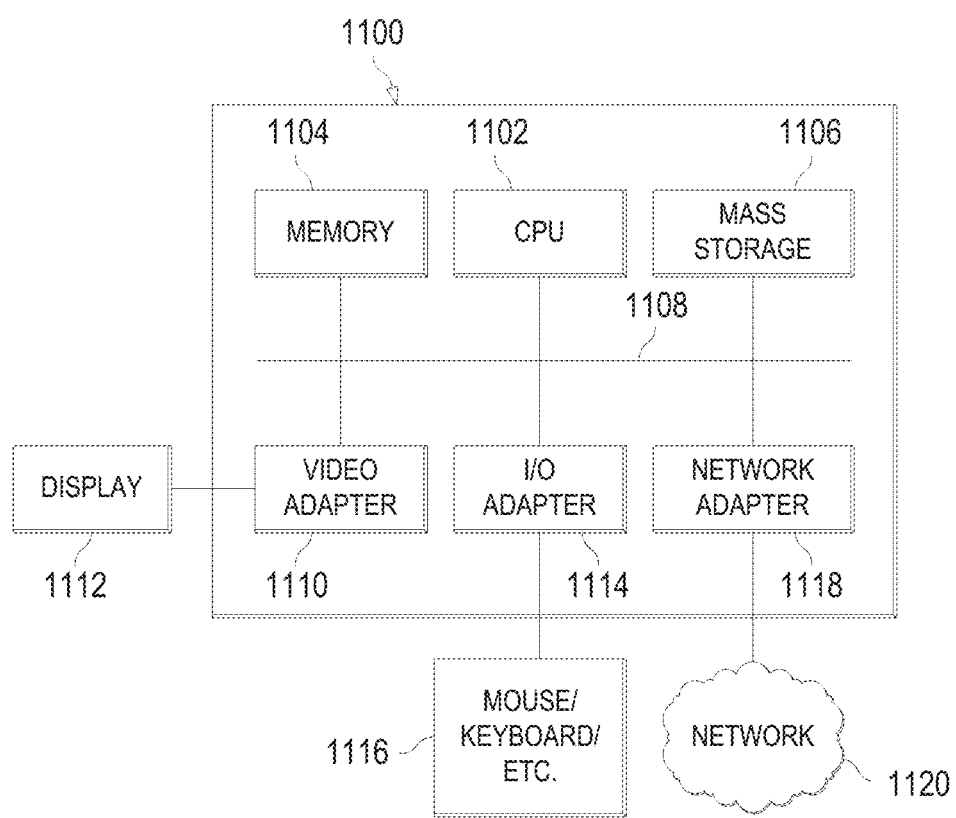
FIG. 11 illustrates a block diagram of a processing system that may be used to implement portions of embodiment radar-based detection systems.

Referring now to FIG. 11, a block diagram of a processing system 1100 is provided in accordance with an embodiment of the present invention. The processing system 1100 depicts a general-purpose platform and the general components and functionality that may be used to implement portions of the embodiment occupancy detection system and/or an external computer or processing device interfaced to the embodiment occupancy detection system. The processing system 1100 may include, for example, a central processing unit (CPU) 1102, memory 1104, and a mass storage device 1106 connected to a bus 1108 configured to perform the processes discussed above. The processing system 1100 may further include, if desired or needed, a video adapter 1110 to provide connectivity to a local display 1112 and an input-output (I/O) Adapter 1114 to provide an input/output interface for one or more input/output devices 1116, such as a mouse, a keyboard, printer, tape drive, CD drive, or the like.

The processing system 1100 also includes a network interface 1118, which may be implemented using a network adaptor configured to be coupled to a wired link, such as an Ethernet cable, USB interface, or the like, and/or a wireless/cellular link for communications with a network 1120. The network interface 1118 may also include a suitable receiver and transmitter for wireless communications. It should be noted that the processing system 1100 may include other components. For example, the processing system 1100 may include power supplies, cables, a motherboard, removable storage media, cases, and the like. These other components, although not shown, are considered part of the processing system 1100.

Figure 12:
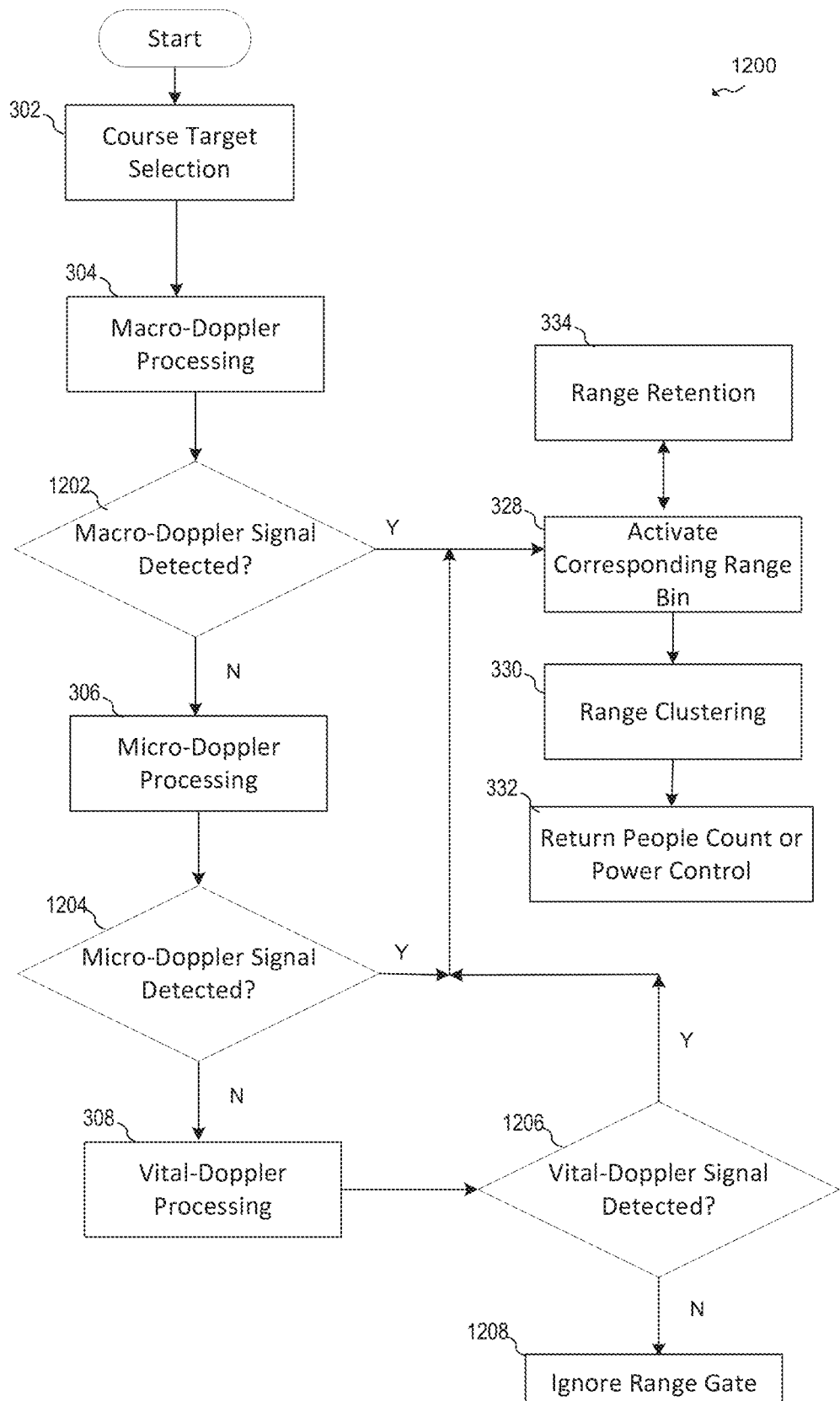
FIG. 12 illustrates a block diagram of a method for detecting the number of human beings within an area, in accordance with an embodiment where macro-Doppler, micro-Doppler, and vital-Doppler processing are performed sequentially.

FIG. 12 shows a block diagram of a method 1200 for detecting the number of human beings within an area or for controlling power, in accordance with an embodiment where macro-Doppler, micro-Doppler, and vital-Doppler processing are performed sequentially. As shown in FIG. 12, following course target selection (in step 302), macro-Doppler processing 304 is performed (e.g. in accordance with the aforementioned examples). In step 1202, a determination is made as to whether a macro-Doppler signal is detected. In response to a determination that a macro-Doppler signal is present, the method 1200 does not perform micro-Doppler processing and vital-Doppler processing. Instead, the method 1200 proceeds to steps 328, 330, 332, and 334 described in the aforementioned examples. In other words, the method 1200 relies on the macro-Doppler signal and not a micro-Doppler or vital-Doppler signal for counting people or controlling power. On the other hand, in response to a determination that a macro-Doppler signal is absent, the method 1200 proceeds to micro-Doppler processing 306. In step 1204, a determination is made as to whether a micro-Doppler signal is detected. In response to a determination that a micro-Doppler signal is present, the method 1200 does not perform vital-Doppler processing and, instead, proceeds to steps 328, 330, 332, and 334 described in the aforementioned examples, thereby relying on the micro-Doppler signal and not a macro-Doppler or vital-Doppler signal for counting people or controlling power. On the other hand, in response to a determination that a micro-Doppler signal is absent, the method 1200 proceeds to vital-Doppler processing 308. In step 1206, a determination is made as to whether a vital-Doppler signal is detected. In response to a determination that a vital-Doppler signal is present, the method 1200 proceeds to steps 328, 330, 332, and 334 described in the aforementioned examples, thereby relying on the vital-Doppler signal and not a macro-Doppler or micro-Doppler signal for counting people or controlling power. On the other hand, in response to a determination that a micro-Doppler signal is absent, the method 1200 ignores the given range gate (in step 1208).

An embodiment method includes identifying a set of targets within a field of view of a millimeter-wave radar sensor based on radar data received by the millimeter-wave radar sensor; capturing radar data corresponding to the set of targets across a macro-Doppler frame; performing macro-Doppler processing on the macro-Doppler frame and determining whether a macro-Doppler signal is present in the macro-Doppler frame based on the macro-Doppler processing; capturing radar data corresponding to the set of targets across a micro-Doppler frame, wherein the micro-Doppler frame has a duration equal to a first plurality of macro-Doppler frames; performing micro-Doppler processing on the micro-Doppler frame and determining whether a micro-Doppler signal is present in the micro-Doppler frame based on the micro-Doppler processing; and activating at least one range bin of a plurality of range bins in response to a determination that at least one of the macro-Doppler signal or the micro-Doppler signal is present.

An embodiment system includes a processing system configured to be coupled to a millimeter-wave radar sensor. The processing system is configured to instruct the millimeter-wave radar sensor to transmit a series of chirps within a field of view of the millimeter-wave radar sensor; identify a set of targets within the field of view based on radar data received by the millimeter-wave radar sensor and in response to transmission of the series of chirps; capture radar data corresponding to the set of targets across a macro-Doppler frame; perform macro-Doppler processing on the macro-Doppler frame within a first range of frequencies and determine whether a macro-Doppler signal is present in the macro-Doppler frame based on the macro-Doppler processing; capture radar data corresponding to the set of targets across a micro-Doppler frame, wherein the micro-Doppler frame has a duration equal to a first plurality of macro-Doppler frames; perform micro-Doppler processing on the micro-Doppler frame within a second range of frequencies orthogonal to the first range of frequencies and determine whether a micro-Doppler signal is present in the micro-Doppler frame based on the micro-Doppler processing; and activate at least one range bin of a plurality of range bins in response to a determination that at least one of the macro-Doppler signal or the micro-Doppler signal is present.

An embodiment executable program, stored on a non-transitory computer readable storage medium, includes instructions to instruct a millimeter-wave radar sensor to transmit a series of chirps within a field of view of the millimeter-wave radar sensor; identify a set of targets within the field of view based on radar data received by the millimeter-wave radar sensor and in response to transmission of the series of chirps; capture radar data corresponding to the set of targets across a macro-Doppler frame; perform macro-Doppler processing on the macro-Doppler frame and determining whether a macro-Doppler signal is present in the macro-Doppler frame based on the macro-Doppler processing; capture radar data corresponding to the set of targets across a micro-Doppler frame, wherein the micro-Doppler frame has a duration equal to a first plurality of macro-Doppler frames; perform micro-Doppler processing on the micro-Doppler frame and determining whether a micro-Doppler signal is present in the micro-Doppler frame based on the micro-Doppler processing; and activate at least one range bin of a plurality of range bins in response to a determination that at least one of the macro-Doppler signal or the micro-Doppler signal is present.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The devices and processing systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a processor, a digital signal processor (DSP), an Application Specific Integrated Circuit (ASIC), a field programmable gate array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method, comprising:

identifying, by a processor, a set of targets within a field of view of a millimeter-wave radar sensor based on radar data received by the millimeter-wave radar sensor;

capturing, by the processor, radar data corresponding to the set of targets across a macro-Doppler frame;

performing, by the processor, macro-Doppler processing on the macro-Doppler frame and determining whether a macro-Doppler signal is present in the macro-Doppler frame based on the macro-Doppler processing;

capturing, by the processor, radar data corresponding to the set of targets across a micro-Doppler frame, wherein the micro-Doppler frame has a duration equal to a first plurality of macro-Doppler frames;

performing, by the processor, micro-Doppler processing on the micro-Doppler frame and determining, by the processor, whether a micro-Doppler signal is present in the micro-Doppler frame based on the micro-Doppler processing;

in response to a determination that the macro-Doppler signal is present in a first range bin, activating, by the processor, the first range bin in which the macro-Doppler signal is present and initializing a first life-cycle count value associated with the first range bin to a first initial value;

in response to a determination that the micro-Doppler signal is present in a second range bin, activating, by the processor, the second range bin in which the micro-Doppler signal is present and initializing a second life-cycle count value associated with the second range bin to a second initial value, wherein the first initial value is greater than the second initial value;

in response to a determination that the macro-Doppler signal is not present in the first range bin in a subsequent macro-Doppler frame, decrementing, by the processor, the first life-cycle count value associated with the first range bin;

in response to a determination that the micro-Doppler signal is not present in the second range bin in a subsequent micro-Doppler frame, decrementing, by the processor, the second life-cycle count value associated with the second range bin;

deactivating, by the processor, the first range bin when the first life-cycle count value associated with the first range bin decreases to a first predetermined value;

deactivating, by the processor, the second range bin when the second life-cycle count value associated with the second range bin decreases to a second predetermined value; and determining, by the processor, a number of people in the field of view of the millimeter-wave radar sensor based on a number of activated range bins.

2. The method of claim 1, wherein performing micro-Doppler processing on the micro-Doppler frame and determining whether the micro-Doppler signal is present occurs in parallel to performing macro-Doppler processing on the macro-Doppler frame and determining whether the macro-Doppler signal is present.

3. The method of claim 1, wherein performing micro-Doppler processing on the micro-Doppler frame and determining whether the micro-Doppler signal is present occurs after performing macro-Doppler processing on the macro-Doppler frame and determining whether the macro-Doppler signal is present and in response to a determination that the macro-Doppler signal is absent.

4. The method of claim 1, further comprising:

capturing, by the processor, radar data corresponding to the set of targets across a vital-Doppler frame, wherein the vital-Doppler frame has a duration equal to a second plurality of macro-Doppler frames, wherein a number of macro-Doppler frames in the second plurality of macro-Doppler frames is greater than a number of macro-Doppler frames in the first plurality of macro-Doppler frames; and performing, by the processor, vital-Doppler processing on the vital-Doppler frame and determining whether a vital-Doppler signal is present in the vital-Doppler frame based on the vital-Doppler processing.

5. The method of claim 4, wherein performing vital-Doppler processing on the vital-Doppler frame and determining whether the vital-Doppler signal is present occurs in parallel to performing macro-Doppler processing on the macro-Doppler frame and determining whether the macro-Doppler signal is present and in parallel to performing micro-Doppler processing on the micro-Doppler frame and determining whether the micro-Doppler signal is present.

6. The method of claim 4, wherein performing vital-Doppler processing on the vital-Doppler frame and determining whether the vital-Doppler signal is present occurs after performing macro-Doppler processing on the macro-Doppler frame and determining whether the macro-Doppler signal is present, after performing micro-Doppler processing on the micro-Doppler frame and determining whether the micro-Doppler signal is present, and in response to a determination that the macro-Doppler signal and the micro-Doppler signal are absent.

7. The method of claim 4, wherein performing vital-Doppler processing on the vital-Doppler frame and determining whether the vital-Doppler signal is present comprises:

performing a first filtering on the vital-Doppler frame to produce a first-filtered vital-Doppler frame;

determining a current breathing cycle based on the first-filtered vital-Doppler frame;

determining whether the current breathing cycle is within a first predetermined range; and determining that the vital-Doppler signal is present in response to a determination that the current breathing cycle is within the first predetermined range.

8. The method of claim 4, wherein performing vital-Doppler processing on the vital-Doppler frame and determining whether the vital-Doppler signal is present comprises:

performing a second filtering on the vital-Doppler frame to produce a second-filtered vital-Doppler frame;

determining a current heart rate based on the second-filtered vital-Doppler frame;

determining whether the current heart rate is within a second predetermined range; and determining that the vital-Doppler signal is present in response to a determination that the current heart rate is within the second predetermined range.

9. The method of claim 4, further comprising:
operating the millimeter-wave radar sensor in a first power mode in response to a determination that the macro-Doppler signal and the micro-Doppler signal is present;
operating the millimeter-wave radar sensor in a second power mode in response to a determination that the macro-Doppler signal is absent and the micro-Doppler signal is present, wherein the second power mode causes the millimeter-wave radar sensor to consume less power compared to the first power mode;
operating the millimeter-wave radar sensor in a third power mode in response to a determination that the macro-Doppler signal and the micro-Doppler signal are absent and the vital-Doppler signal is present, wherein the third power mode causes the millimeter-wave radar sensor to consume less power compared to the second power mode; and
operating the millimeter-wave radar sensor in a fourth power mode in response to a determination that the macro-Doppler signal, the micro-Doppler signal, and the vital-Doppler signal are absent, wherein the fourth power mode causes the millimeter-wave radar sensor to consume less power compared to the third power mode.

10. The method of claim 4, wherein the vital-Doppler processing is configured to detect a maximum Doppler frequency of about 52 Hz with a frequency resolution of about 0.1 Hz.

11. The method of claim 1, wherein performing macro-Doppler processing on the macro-Doppler frame and determining whether the macro-Doppler signal is present comprises:
performing macro-Doppler filtering on the macro-Doppler frame using a first plurality of filters;
determining an energy of an output signal of the first plurality of filters;
comparing the energy of the output signal of the first plurality of filters against a first noise threshold; and
determining that the macro-Doppler signal is present in response to the energy of the output signal of the first plurality of filters being greater than the first noise threshold.

12. The method of claim 11, wherein performing micro-Doppler processing on the micro-Doppler frame and determining whether the micro-Doppler signal is present comprises:
performing micro-Doppler filtering on the micro-Doppler frame using a second plurality of filters;
determining an energy of an output signal of the second plurality of filters;
comparing the energy of the output signal of the second plurality of filters against a second noise threshold; and
determining that the micro-Doppler signal is present in response to the energy of the output signal of the second plurality of filters being greater than the second noise threshold.

13. The method of claim 12, wherein a passband of the first plurality of filters is orthogonal to a passband of the second plurality of filters.

14. The method of claim 1, wherein performing macro-Doppler processing on the macro-Doppler frame and determining whether the macro-Doppler signal is present comprises:
determining a mean of the macro-Doppler frame;
subtracting the mean of the macro-Doppler frame from the macro-Doppler frame to generate a mean-compensated macro-Doppler frame;
generating a range macro-Doppler map of the mean-compensated macro-Doppler frame;
comparing the range macro-Doppler map against a third noise threshold; and
determining that the macro-Doppler signal is present in response to at least one point of the range macro-Doppler map being greater than the third noise threshold.

15. The method of claim 14, wherein performing micro-Doppler processing on the micro-Doppler frame and determining whether the micro-Doppler signal is present comprises:
determining a mean of the micro-Doppler frame;
subtracting the mean of the micro-Doppler frame from the micro-Doppler frame to generate a mean-compensated micro-Doppler frame;
generating a range micro-Doppler map of the mean-compensated micro-Doppler frame;
comparing the range micro-Doppler map against a fourth noise threshold; and
determining that the micro-Doppler signal is present in response to at least one point of the range micro-Doppler map being greater than the fourth noise threshold.

16. The method of claim 1, further comprising:
clustering adjacent activated range bins into a single activated range cluster; and
determining the number of people in the field of view of the millimeter-wave radar sensor further based on a number of single activated range clusters.

17. The method of claim 1, wherein the macro-Doppler processing is configured to detect a maximum Doppler frequency of about 31 kHz with a frequency resolution of about 1.95 kHz.

18. The method of claim 1, wherein the micro-Doppler processing is configured to detect a maximum Doppler frequency of about 2 kHz with a frequency resolution of about 130 Hz.

19. A system, comprising:
a processing system configured to be coupled to a millimeter-wave radar sensor, wherein the processing system comprises a processor configured to:
instruct the millimeter-wave radar sensor to transmit a series of chirps within a field of view of the millimeter-wave radar sensor;
identify a set of targets within the field of view based on radar data received by the millimeter-wave radar sensor and in response to transmission of the series of chirps;
capture radar data corresponding to the set of targets across a macro-Doppler frame;
perform macro-Doppler processing on the macro-Doppler frame within a first range of frequencies and determine whether a macro-Doppler signal is present in the macro-Doppler frame based on the macro-Doppler processing;
capture radar data corresponding to the set of targets across a micro-Doppler frame, wherein the micro-Doppler frame has a duration equal to a first plurality of macro-Doppler frames;
perform micro-Doppler processing on the micro-Doppler frame within a second range of frequencies orthogonal to the first range of frequencies and determine whether a micro-Doppler signal is present in the micro-Doppler frame based on the micro-Doppler processing;

in response to a determination that the macro-Doppler signal is present in a first range bin, activate the first range bin in which the macro-Doppler signal is present and initializing a first life-cycle count value associated with the first range bin to a first initial value;

in response to a determination that the micro-Doppler signal is present in a second range bin, activate the second range bin in which the micro-Doppler signal is present and initializing a second life-cycle count value associated with the second range bin to a second initial value, wherein the first initial value is greater than the second initial value;

in response to a determination that the macro-Doppler signal is not present in the first range bin in a subsequent macro-Doppler frame, decrement the first life-cycle count value associated with the first range bin;

in response to a determination that the micro-Doppler signal is not present in the second range bin in a subsequent micro-Doppler frame, decrement the second life-cycle count value associated with the second range bin;

deactivate the first range bin when the first life-cycle count value associated with the first range bin decreases to a first predetermined value;

deactivate the second range bin when the second life-cycle count value associated with the second range bin decreases to a second predetermined value; and determine a number of people in the field of view of the millimeter-wave radar sensor based on a number of activated range bins.

20. The system of claim 19, wherein the processing system is further configured to:

capture radar data corresponding to the set of targets across a vital-Doppler frame, wherein the vital-Doppler frame has a duration equal to a second plurality of macro-Doppler frames, wherein a number of macro-Doppler frames in the second plurality of macro-Doppler frames is greater than a number of macro-Doppler frames in the first plurality of macro-Doppler frames; and perform vital-Doppler processing on the vital-Doppler frame for a third range of frequencies orthogonal to the second range of frequencies and determining whether a vital-Doppler signal is present in the vital-Doppler frame based on the vital-Doppler processing.

21. The system of claim 20, wherein the vital-Doppler signal comprises a heart rate or a respiration rate, wherein the macro-Doppler signal is indicative of a first bodily motion, and wherein the micro-Doppler signal is indicative of a second bodily motion having an amplitude lower than the first bodily motion.

22. The system of claim 20, wherein the processing system is further configured to:

operate the millimeter-wave radar sensor in a first power mode in response to a determination that the macro-Doppler signal and the micro-Doppler signal is present;

operate the millimeter-wave radar sensor in a second power mode in response to a determination that the macro-Doppler signal is absent and the micro-Doppler signal is present, wherein the second power mode causes the millimeter-wave radar sensor to consume less power compared to the first power mode;

operate the millimeter-wave radar sensor in a third power mode in response to a determination that the macro-Doppler signal and the micro-Doppler signal are absent and the vital-Doppler signal is present, wherein the third power mode causes the millimeter-wave radar sensor to consume less power compared to the second power mode; and operate the millimeter-wave radar sensor in a fourth power mode in response to a determination that the macro-Doppler signal, the micro-Doppler signal, and the vital-Doppler signal are absent, wherein the fourth power mode causes the millimeter-wave radar sensor to consume less power compared to the third power mode.

23. The system of claim 19, wherein the processing system is further configured to:

cluster adjacent activated range bins into a single activated range cluster; and determine the number of people in the field of view of the millimeter-wave radar sensor further based on a number of single activated range clusters.

24. A non-transitory computer readable storage medium with an executable program stored thereon for execution on a processor, the executable program including instructions to cause the processor to:

instruct a millimeter-wave radar sensor to transmit a series of chirps within a field of view of the millimeter-wave radar sensor;

identify a set of targets within the field of view based on radar data received by the millimeter-wave radar sensor and in response to transmission of the series of chirps;

capture radar data corresponding to the set of targets across a macro-Doppler frame;

perform macro-Doppler processing on the macro-Doppler frame and determining whether a macro-Doppler signal is present in the macro-Doppler frame based on the macro-Doppler processing;

capture radar data corresponding to the set of targets across a micro-Doppler frame, wherein the micro-Doppler frame has a duration equal to a first plurality of macro-Doppler frames;

perform micro-Doppler processing on the micro-Doppler frame and determining whether a micro-Doppler signal is present in the micro-Doppler frame based on the micro-Doppler processing;

in response to a determination that the macro-Doppler signal is present in a first range bin, activate the first range bin in which the macro-Doppler signal is present and initializing a first life-cycle count value associated with the first range bin to a first initial value;

in response to a determination that the micro-Doppler signal is present in a second range bin, activate the second range bin in which the micro-Doppler signal is present and initializing a second life-cycle count value associated with the second range bin to a second initial value, wherein the first initial value is greater than the second initial value;

in response to a determination that the macro-Doppler signal is not present in the first range bin in a subsequent macro-Doppler frame, decrement the first life-cycle count value associated with the first range bin;

in response to a determination that the micro-Doppler signal is not present in the second range bin in a subsequent micro-Doppler frame, decrement the second life-cycle count value associated with the second range bin;

deactivate the first range bin when the first life-cycle count value associated with the first range bin decreases to a first predetermined value;

deactivate the second range bin when the second lifecycle count value associated with the second range bin decreases to a second predetermined value; and determine a number of people in the field of view of the millimeter-wave radar sensor based on a number of activated range bins.

25. The non-transitory computer readable storage medium of claim 24, wherein the executable program is further configured to:

cluster adjacent activated range bins into a single activated range cluster; and determine the number of people in the field of view of the millimeter-wave radar sensor further based on a number of single activated range clusters present in a plurality of range bins.

26. The method of claim 1, wherein the first predetermined value is zero, and the second predetermined value is zero.

* * * * *